(12) United States Patent
Odaka

(10) Patent No.: US 10,851,813 B2
(45) Date of Patent: Dec. 1, 2020

(54) METHOD FOR PRODUCING PISTON ASSEMBLY AND HYDRAULIC FLUID DEVICE

(71) Applicant: SMC CORPORATION, Chiyoda-ku (JP)

(72) Inventor: Tsukasa Odaka, Tsukubamirai (JP)

(73) Assignee: SMC CORPORATION, Chiyoda-ku (JP)

(*) Notice: Subject to any disclaimer, the term of this patent is extended or adjusted under 35 U.S.C. 154(b) by 0 days.

(21) Appl. No.: 16/324,297

(22) PCT Filed: Jun. 27, 2017

(86) PCT No.: PCT/JP2017/023524
§ 371 (c)(1),
(2) Date: Feb. 8, 2019

(87) PCT Pub. No.: WO2018/030012
PCT Pub. Date: Feb. 15, 2018

(65) Prior Publication Data
US 2019/0170168 A1 Jun. 6, 2019

(30) Foreign Application Priority Data
Aug. 10, 2016 (JP) .................. 2016-157593

(51) Int. Cl.
*F15B 15/14* (2006.01)
*F16J 9/12* (2006.01)
(Continued)

(52) U.S. Cl.
CPC .......... *F15B 15/1452* (2013.01); *F15B 15/14* (2013.01); *F15B 15/2861* (2013.01); *F16J 1/005* (2013.01); *F16J 9/12* (2013.01)

(58) Field of Classification Search
CPC .. F15B 15/14; F15B 15/2861; F15B 15/1452; F16J 1/005; F16J 9/12
(Continued)

(56) References Cited

U.S. PATENT DOCUMENTS 3,391,614 A * 7/1968 Kampert ............. F15B 15/1452
92/244
3,887,301 A * 6/1975 Henkel ................... B23P 11/02
417/53

(Continued)

FOREIGN PATENT DOCUMENTS

CN 2793449 Y 7/2006
CN 101218436 A 7/2008
(Continued)

OTHER PUBLICATIONS

Office Action dated Sep. 17, 2019 in Japanese Patent Application No. 2016-157593, 6 pages (with unedited computer generated English translation).
(Continued)

*Primary Examiner* — Thomas E Lazo
*Assistant Examiner* — Daniel S Collins
(74) *Attorney, Agent, or Firm* — Oblon, McClelland, Maier & Neustadt, L.L.P.

(57) ABSTRACT

A hydraulic fluid cylinder is equipped with a cylinder tube, a piston unit, and a piston rod. The piston unit has a piston body comprising a plurality of members and provided with a gasket-mounting groove. The piston body has a first piston member and a second piston member which are layered in the axial direction. The gasket-mounting groove is formed from a combination of at least two members. A thin section exhibiting depth in the axial direction is provided in the first piston member and/or the second piston member.

17 Claims, 12 Drawing Sheets

(51) Int. Cl.
  *F15B 15/28* (2006.01)
  *F16J 1/00* (2006.01)
(58) Field of Classification Search
  USPC .......................................................... 92/172
  See application file for complete search history.

(56) References Cited

U.S. PATENT DOCUMENTS

| | | | |
|---|---|---|---|
| 4,735,129 | A | 4/1988 | Sjoberg |
| 2006/0197389 | A1 | 9/2006 | Terasaki |
| 2010/0314838 | A1* | 12/2010 | Slack ...................... F16J 1/008 277/520 |
| 2015/0075368 | A1 | 3/2015 | Koontz |

FOREIGN PATENT DOCUMENTS

| | | |
|---|---|---|
| CN | 201599273 U | 10/2010 |
| CN | 202628656 U | 12/2012 |
| CN | 105041772 A | 11/2015 |
| CN | 105387118 A | 3/2016 |
| CN | 205117882 U | 3/2016 |
| JP | 37-25908 U | 9/1962 |
| JP | 54-34892 U1 | 3/1979 |
| JP | 57-6803 Y2 | 2/1982 |
| JP | 63-157509 U | 10/1988 |
| JP | 63-195960 U | 12/1988 |
| JP | 10-2416 A | 1/1998 |
| JP | 11-82424 A | 3/1999 |
| JP | 11-230229 A | 8/1999 |
| JP | 2000-233333 A | 8/2000 |
| JP | 2003-120602 A | 4/2003 |
| JP | 2006-242341 A | 9/2006 |
| JP | 2011-185343 A | 9/2011 |
| JP | 2012-2325 A | 1/2012 |
| JP | 5435434 B2 | 3/2014 |
| RU | 2 509 016 C2 | 3/2014 |
| TW | M446250 U1 | 2/2013 |

OTHER PUBLICATIONS

International Search Report dated Sep. 5, 2017 in PCT/JP2017/023524 filed Jun. 27, 2017.
U.S. Appl. No. 16/324,297, filed Feb. 8, 2019, Tsukasa Odaka.
U.S. Appl. No. 16/324,428, filed Feb. 8, 2019, Tsukasa Odaka.
U.S. Appl. No. 16/324,432, filed Feb. 8, 2019, Tsukasa Odaka.
Combined Chinese Office Action and Search Report dated Nov. 15, 2019 in corresponding Chinese Patent Application No. 201780048860.4 (with Partial English Translation and English Translation of Category of Cited Documents), 10 pages.
Combined Russian Office Action and Search Report dated Oct. 30, 2019 in corresponding Russian Patent Application No. 2019106679/06(012905), (with English Translation), 12 pages.
Combined Chinese Office Action and Search Report dated Nov. 1, 2019, in Patent Application No. 201780048873.1 (with English translation), 16 pages.
Combined Chinese Office Action and Search Report dated Nov. 1, 2019, in Patent Application No. 201780048869.5 (with English translation), 16 pages.
Japanese Office Action dated Nov. 19, 2019 in Patent Application No. 2016-157593 (with English translation), 6 pages.
Combined Chinese Office Action and Search Report dated Apr. 29, 2020 in Chinese Patent Application No. 201780048869.5 (with unedited computer generated English translation and English translation of Category of Cited Documents), 18 pages.
Combined Chinese Office Action and Search Report dated May 11, 2020 in Chinese Patent Application No. 201780048873.1 (with unedited computer generated English translation and English translation of Category of Cited Documents), 18 pages.
Korean Office Action dated Apr. 17, 2020, in Patent Application No. 10-2019-7006867, 13 pages (with unedited computer generated English translation).
Indian Office Action dated Apr. 20, 2020, in Patent Application No. 201947009109, 5 pages.

* cited by examiner

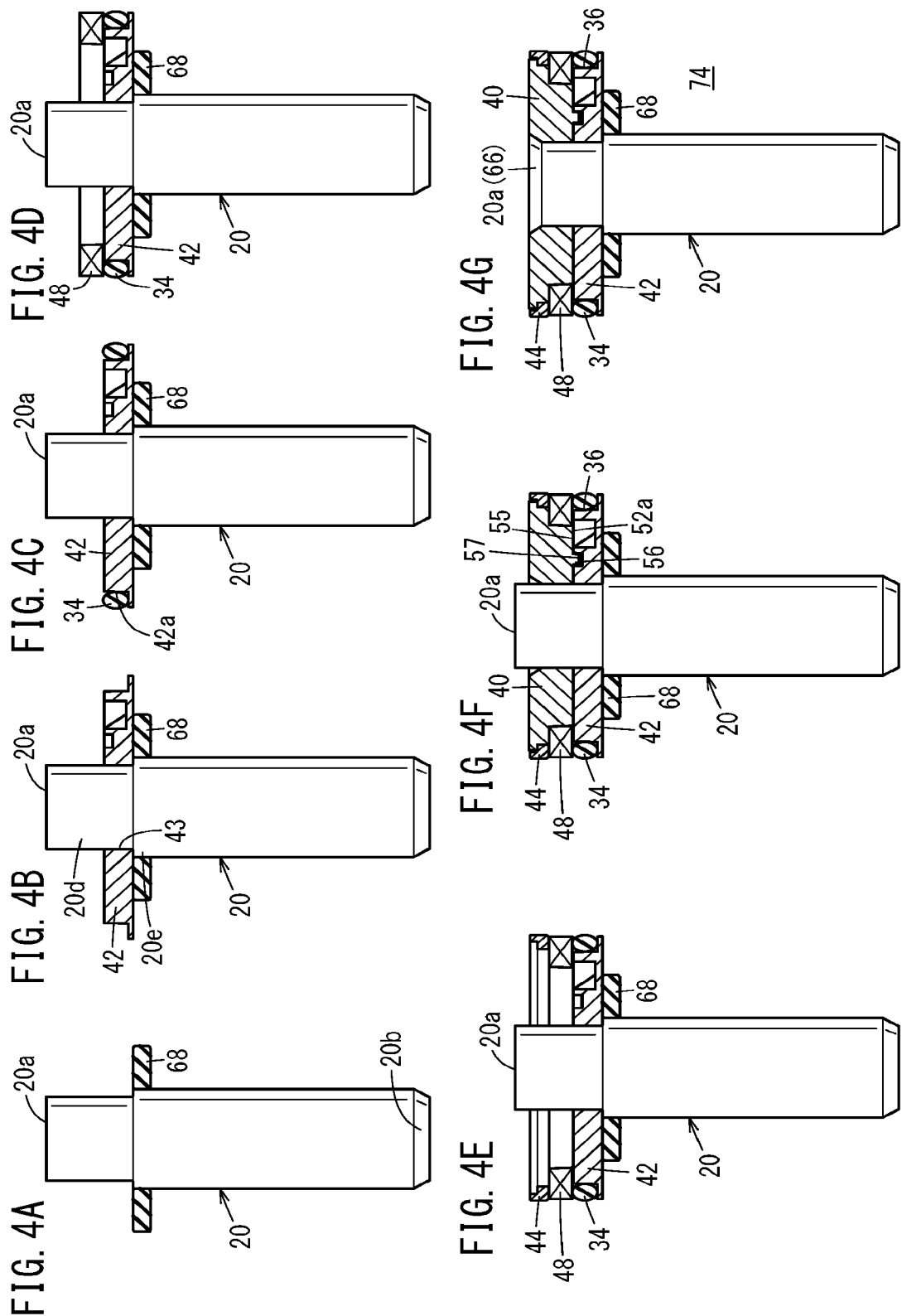

METHOD FOR PRODUCING PISTON ASSEMBLY AND HYDRAULIC FLUID DEVICE

TECHNICAL FIELD

The present invention relates to a fluid pressure device (hydraulic fluid device) provided with a piston and a method for producing a piston assembly.

BACKGROUND ART

Conventionally, various devices are known as fluid pressure devices provided with pistons. For example, fluid pressure cylinders including pistons displaced by the effect of supplied pressurized fluid are well known as means (actuators) for transporting workpieces and the like. A typical fluid pressure cylinder includes a cylinder tube, a piston disposed inside the cylinder tube so as to be movable in the axial direction, and a piston rod connected to the piston (for example, see Japanese Laid-Open Patent Publication No. 2003-120602). In such a fluid pressure cylinder, when pressurized fluid such as air is supplied into the cylinder tube, the piston is pushed by the pressurized fluid and displaced in the axial direction. This also causes the piston rod connected to the piston to be displaced in the axial direction.

SUMMARY OF INVENTION

The piston has, on an outer circumferential part thereof, a packing mounting groove in which a packing is mounted. In a conventional fluid pressure cylinder, the packing mounting groove is formed by grooving (cutting). Thus, during an assembly process, the packing needs to be pulled radially outward for an increase in diameter, in order to attach the packing to the piston. Such an attachment process is not easily automated using robots, and the productivity is difficult to increase.

The present invention has been devised taking into consideration the aforementioned problems, and has the object of providing a fluid pressure device and a method for producing a piston assembly allowing productivity to be increased.

To achieve the above-described object, a fluid pressure device of the present invention includes a body having a slide hole inside the body, a piston unit movable in an axial direction inside the slide hole, and a piston rod protruding from the piston unit in the axial direction, wherein the piston unit includes a packing and a piston body including a plurality of members, the piston body being provided with a packing mounting groove in which the packing is mounted, the piston body includes, as the plurality of members, a first piston member and a second piston member stacked in the axial direction, a combination of at least two members of the plurality of members defines the packing mounting groove, and one or both of the first piston member and the second piston member are provided with a lightening portion having a depth in the axial direction.

According to the fluid pressure device of the present invention adopting the above-described structure, the combination of the plurality of members defines the packing mounting groove. Thus, it is possible to improve productivity, compared with a case where a groove in which the packing is mounted is formed by grooving (cutting). Moreover, the packing can be attached to the piston body without the need to increase the diameter of the packing in the assembly process of the piston unit. Consequently, the process of mounting the packing can be easily automated using robots, leading to an increase in productivity. Furthermore, since at least one of the first piston member and the second piston member is provided with the lightening portion, the amount of material used therefor can be significantly reduced in a case where the first piston member and the second piston member are shaped by, for example, casting or injection molding. Thus, the fluid pressure device is economical and leads to resource savings.

In the above-described fluid pressure device, the first piston member and the second piston member may be castings.

In the above-described fluid pressure device, the lightening portion may have a through-hole passing through only one of the first piston member and the second piston member in the axial direction.

In the above-described fluid pressure device, one member of the first piston member and the second piston member that is provided with the through-hole may include a protruding portion protruding toward another member of the first piston member and the second piston member that is not provided with the through-hole, and the protruding portion may have, on an outer circumferential part thereof, a recess portion recessed inward and which constitutes part of the through-hole.

In the above-described fluid pressure device, the piston body may further include a magnet or a spacer as the plurality of members, and the protruding portion may have a supporting protrusion protruding outward on the outer circumferential part and at a circumferential position different from a position of the recess portion, the supporting protrusion being configured to support the magnet or the spacer.

In the above-described fluid pressure device, the one member provided with the through-hole may be provided with a wall portion protruding outwardly toward the through-hole, and the wall portion may be disposed at a position adjoining the recess portion on a side remote, in the axial direction, from the other member not provided with the through-hole.

In the above-described fluid pressure device, the recess portion may be provided with a rib configured to reinforce the wall portion.

In the above-described fluid pressure device, the lightening portion may include a first lightening portion defined in the first piston member and a second lightening portion defined in the second piston member, one of the first lightening portion and the second lightening portion may be a through-hole passing through the corresponding piston member in the axial direction, and another of the first lightening portion and the second lightening portion may be a bottomed groove having a depth in the axial direction.

In the above-described fluid pressure device, the through-hole may include a plurality of through-holes disposed at intervals in a circumferential direction, and the groove may include a plurality of grooves disposed at intervals in the circumferential direction.

In the above-described fluid pressure device, one member of the first piston member and the second piston member that is provided with the plurality of through-holes may include a protruding portion protruding toward another member of the first piston member and the second piston member that is provided with the plurality of grooves, the protruding portion may have a plurality of supporting protrusions arranged at intervals in the circumferential direction on an outer circumferential part of the protruding portion, the supporting protrusions protruding outward, and the other member of the first piston member and the second piston member that is provided with the plurality of grooves may have an abutting surface disposed between two of the grooves that are circumferentially adjacent to each other, the abutting surface being configured to abut against an end surface of at least one of the plurality of supporting protrusions.

In the above-described fluid pressure device, the plurality of supporting protrusions may include a first supporting protrusion abutting against the abutting surface and a second supporting protrusion disposed at a circumferential position different from a position of the abutting surface, and a circumferential width of the second supporting protrusion may be smaller than a circumferential width of the first supporting protrusion.

In the above-described fluid pressure device, one of the first piston member and the second piston member may be provided with a positioning protrusion protruding in the axial direction, another of the first piston member and the second piston member may be provided a positioning recess recessed in the axial direction, and the positioning protrusion may be inserted into the positioning recess.

In the above-described fluid pressure device, the lightening portion may include a plurality of lightening portions disposed at intervals in the circumferential direction.

In the above-described fluid pressure device, the fluid pressure device may be configured as a fluid pressure cylinder, a valve device, a length-measurement cylinder, a sliding table, or a chuck device.

A method for producing a piston assembly of the present invention, the piston assembly being provided with a piston unit including a packing mounted in a packing mounting groove and a piston rod protruding from the piston unit, includes the steps of stacking a plurality of members including a first piston member and a second piston member by relatively moving the packing and the plurality of members in an axial direction in sequence, relative to the piston rod, and securing the first piston member and the second piston member to the piston rod, wherein the plurality of members constitute a piston body provided with the packing mounting groove, a combination of at least two members of the plurality of members defines the packing mounting groove, and one or both of the first piston member and the second piston member are provided with a lightening portion having a depth in the axial direction.

In the above-described method for producing the piston assembly, the piston rod may be in an upright position during the step of stacking the plurality of members.

According to the fluid pressure device and the method for producing the piston assembly of the present invention, the productivity of the fluid pressure device can be easily increased.

The above-described object, features, and advantages will become more apparent from the following description of preferred embodiments in conjunction with the accompanying drawings.

BRIEF DESCRIPTION OF DRAWINGS

FIG. 4A is a first diagram illustrating a method for producing the piston assembly, FIG. 4B is a second diagram illustrating the method for producing the piston assembly, FIG. 4C is a third diagram illustrating the method for producing the piston assembly, FIG. 4D is a fourth diagram illustrating the method for producing the piston assembly, FIG. 4E is a fifth diagram illustrating the method for producing the piston assembly, FIG. 4F is a sixth diagram illustrating the method for producing the piston assembly, and FIG. 4G is a seventh diagram illustrating the method for producing the piston assembly;

DESCRIPTION OF EMBODIMENTS

Preferred embodiments of a fluid pressure cylinder and a method for producing a piston assembly according to the present invention will be described in detail below with reference to the accompanying drawings.

Figure 1:
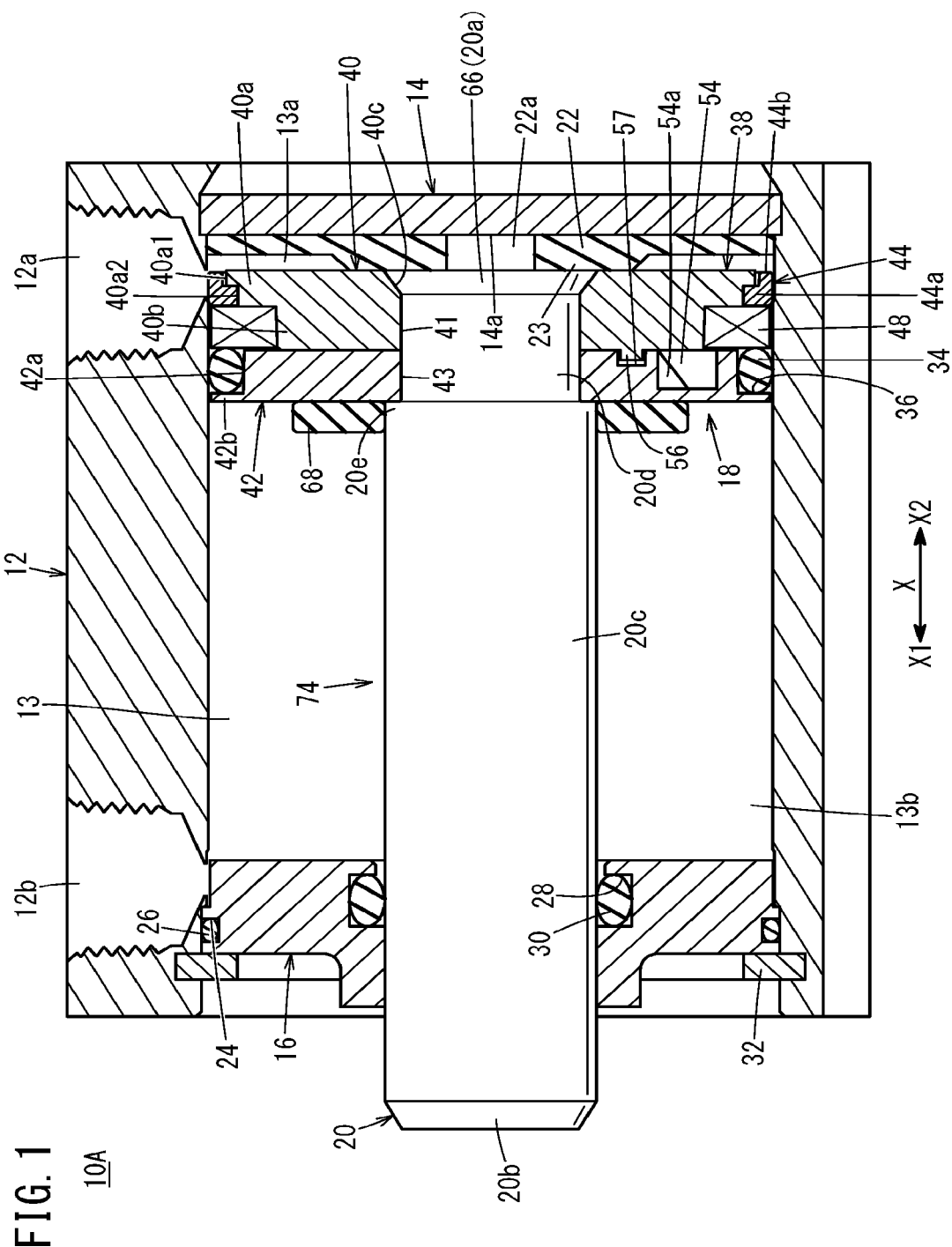
FIG. 1 is a cross-sectional view of a fluid pressure cylinder according to a first embodiment of the present invention.

A fluid pressure cylinder 10A, illustrated in FIG. 1 as an example of a fluid pressure device of the present invention, is provided with a cylinder tube 12 (body) having a hollow tubular shape, a head cover 14 disposed at one end portion of the cylinder tube 12, a rod cover 16 disposed at another end portion of the cylinder tube 12, a piston unit 18 disposed inside the cylinder tube 12 so as to be movable in the axial direction (direction of an arrow X), and a piston rod 20 connected to the piston unit 18. The piston unit 18 and the piston rod 20 constitute a piston assembly 74. The fluid pressure cylinder 10A is used as an actuator for, for example, transporting a workpiece.

The cylinder tube 12 is a tubular structure composed of, for example, a metal material such as aluminum alloy extending in the axial direction. In this embodiment, the cylinder tube 12 has a hollow cylindrical shape. The cylinder tube 12 has a first port 12a disposed on one end side in the axial direction (end located in the direction of an arrow X2), a second port 12b disposed on another end side in the axial direction (end located in the direction of an arrow X1), and a slide hole 13 (cylinder chamber) communicating with the first port 12a and the second port 12b.

The head cover 14 is a plate-shaped structure composed of, for example, a metal material similar to the material of the cylinder tube 12 and closes the one end portion (end portion located in the direction of the arrow X2) of the cylinder tube 12. The head cover 14 hermetically closes the one end portion of the cylinder tube 12.

A first damper 22 is disposed on an inner wall surface 14a of the head cover 14. The first damper 22 is composed of, for example, an elastic material such as rubber or elastomer. The material of the first damper 22 includes, for example, urethane. In this embodiment, the first damper 22 has a ring shape with a through-hole 22a in a central part.

The first damper 22 is provided with an expanding portion 23 disposed on the central part of the first damper 22 and expanding toward the rod cover 16 (toward the piston rod 20 and the piston unit 18). In the first damper 22, the thickness of the expanding portion 23 is larger than the thickness of an outer peripheral part disposed radially outside the expanding portion 23. The expanding portion 23 can be brought into abutment with the piston rod 20 and the piston unit 18 when the piston rod 20 and the piston unit 18 are displaced toward the head cover 14.

The rod cover 16 is a circular ring-shaped member composed of, for example, a metal material similar to the material of the cylinder tube 12 and closes the other end portion (end portion located in the direction of the arrow X1) of the cylinder tube 12. An outer annular groove 24 is formed in an outer circumferential part of the rod cover 16. An outer sealing member 26 composed of an elastic material is mounted in the outer annular groove 24 in order to seal a gap between the outer circumferential surface of the rod cover 16 and the inner circumferential surface of the slide hole 13.

An inner annular groove 28 is formed in an inner circumferential part of the rod cover 16. An inner sealing member 30 composed of an elastic material is mounted in the inner annular groove 28 in order to seal a gap between the inner circumferential surface of the rod cover 16 and the outer circumferential surface of the piston rod 20. The rod cover 16 is locked by a stopper 32 secured to an inner circumferential part of the cylinder tube 12 on the other end side.

The piston unit 18 is accommodated inside the cylinder tube 12 (slide hole 13) so as to be slidable in the axial direction and partitions the interior of the slide hole 13 into a first pressure chamber 13a on the first port 12a side and a second pressure chamber 13b on the second port 12b side. In this embodiment, the piston unit 18 is connected to one end portion 20a (hereinafter referred to as "base end portion 20a") of the piston rod 20.

Figure 2:
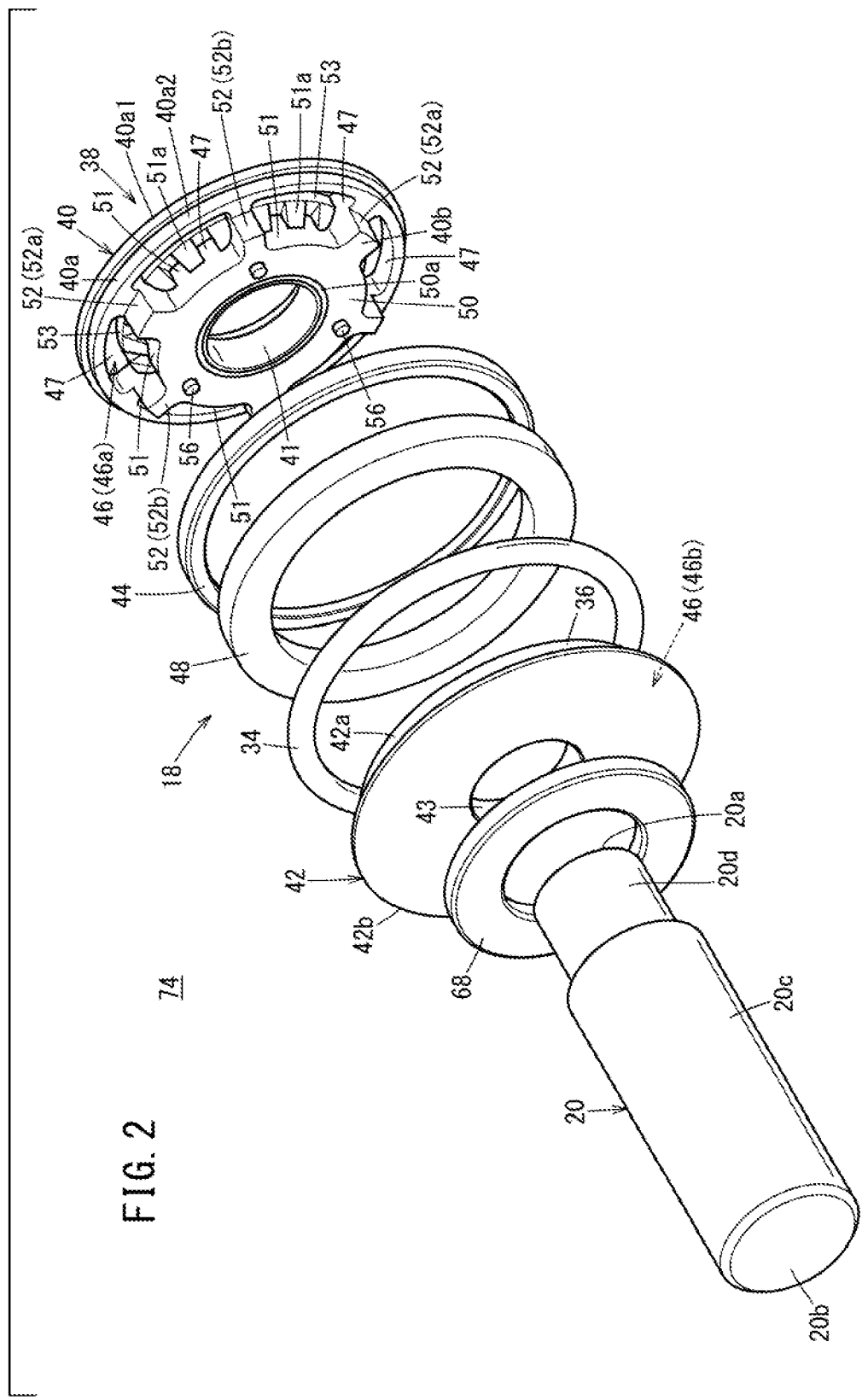
FIG. 2 is an exploded perspective view of a piston assembly of the fluid pressure cylinder illustrated in FIG. 1.

As illustrated in FIG. 1, the piston unit 18 includes a packing 34 and a piston body 38 provided with a packing mounting groove 36. As illustrated in FIGS. 1 and 2, the piston body 38 is provided with a first piston member 40, a second piston member 42, a wear ring 44 (supporting member), and a magnet 48.

The first piston member 40 is a ring-shaped member with a rod insertion hole 41 on the inner side, and the base end portion 20a of the piston rod 20 is inserted into the first piston member 40. The base end portion 20a of the piston rod 20 is crimped or deformed by pressing to secure the first piston member 40 to the piston rod 20.

A wear ring supporting portion 40a supporting the wear ring 44, and a magnet supporting portion 40b supporting the magnet 48 are formed on the outer circumference of the first piston member 40. The wear ring supporting portion 40a and the magnet supporting portion 40b are disposed adjacent or adjoining to each other in the axial direction. The wear ring supporting portion 40a protrudes radially outward beyond the magnet supporting portion 40b. The outer circumference of the wear ring supporting portion 40a includes a large diameter section 40a1 and a small diameter section 40a2. The outer diameter of the small diameter section 40a2 is larger than the outer diameter of the magnet supporting portion 40b. The difference in the outer diameter between the large diameter section 40a1 and the small diameter section 40a2 forms a stepped portion on the outer circumference of the wear ring supporting portion.

The material of the first piston member 40 includes, for example, metal materials such as carbon steel, stainless steel, and aluminum alloy, and hard resin. In this embodiment, the first piston member 40 is shaped by casting. The first piston member 40 may also be shaped by injection molding.

The second piston member 42 is a ring-shaped member with a rod insertion hole 43 on the inner side and is disposed adjoining the first piston member 40. That is, the first piston member 40 and the second piston member 42 are stacked together in the axial direction. In this embodiment, the second piston member 42 is shaped by casting. The second piston member 42 may be shaped by injection molding.

The second piston member 42 includes on the outer circumference a packing supporting portion 42a supporting the inner circumference of the packing 34 and a flange portion 42b protruding radially outward beyond the packing supporting portion 42a. The outer diameter of the packing supporting portion 42a is larger than the outer diameter of the magnet supporting portion 40b of the first piston member 40. The flange portion 42b circumferentially extends over the entire circumference. The second piston member 42 and the magnet 48 jointly form the ring-shaped packing mounting groove 36.

Figure 3:
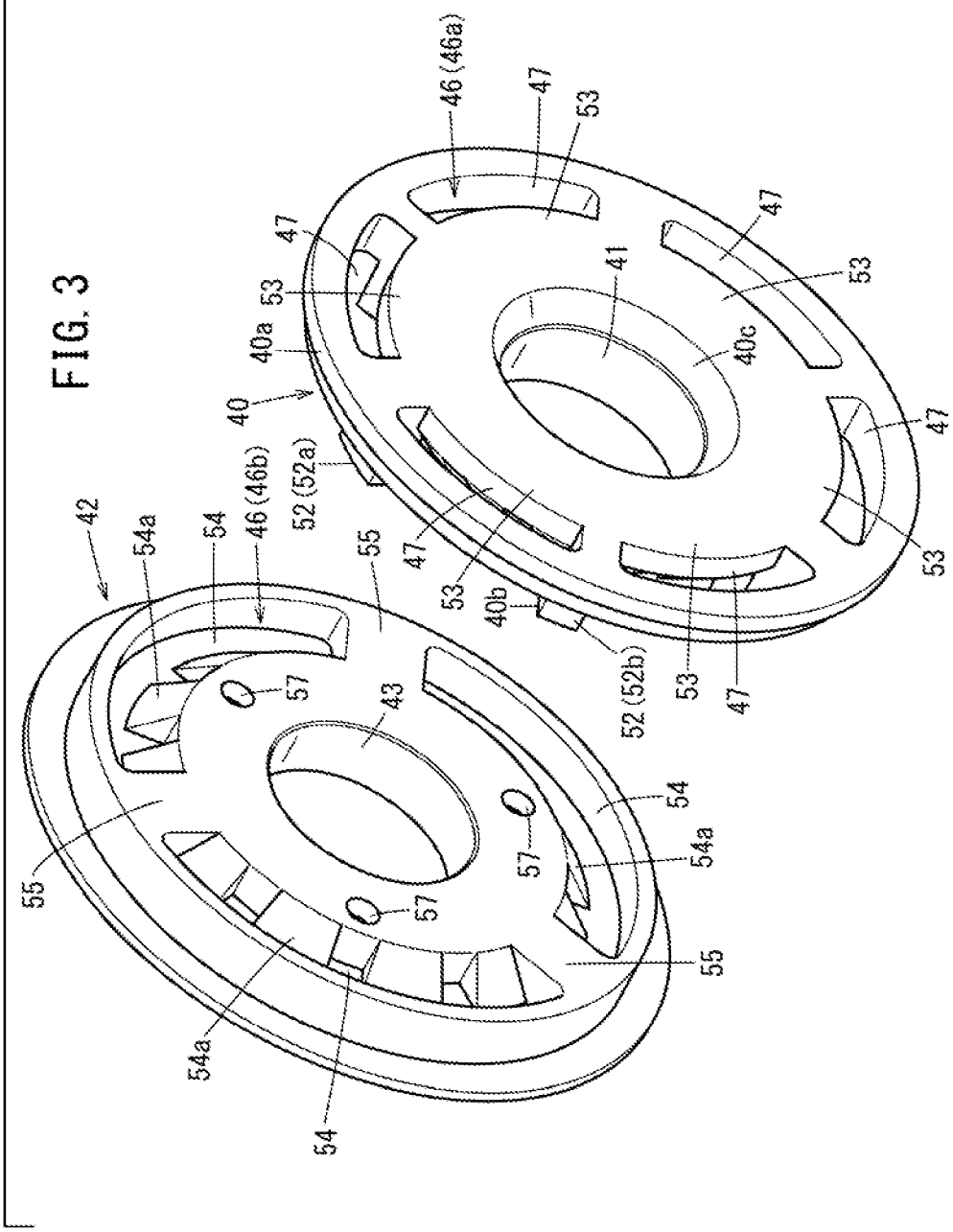
FIG. 3 is a perspective view of a first piston member and a second piston member.

As illustrated in FIGS. 2 and 3, the first piston member 40 and the second piston member 42 are each provided with a lightening portion 46. In this embodiment, the lightening portions 46 include a first lightening portion 46a provided for the first piston member 40 and a second lightening portion 46b provided for the second piston member 42.

The first lightening portion 46a has a plurality of through-holes 47 extending therethrough in the axial direction. The plurality of through-holes 47 are disposed at intervals in the circumferential direction. As illustrated in FIG. 2, the first piston member 40 includes a protruding portion 50 protruding toward the second piston member 42 (one of the first piston member 40 and the second piston member 42 that is not provided with the through-holes 47).

The protruding portion 50 has, on an outer circumference thereof, recess portions 51 recessed inward and which make up part of the through-holes 47. The protruding portion 50 further has a plurality of supporting protrusions 52 on the outer circumference and at circumferential positions different from the positions of the recess portions 51, the supporting protrusions 52 protruding outward and supporting the magnet 48 (or spacer 76, 76a described below). The plurality of supporting protrusions 52 constitute the above-described magnet supporting portion 40b.

In FIG. 2, six supporting protrusions 52 are disposed at intervals of 60°. The plurality of supporting protrusions 52 include a plurality of (three in FIG. 2) first supporting protrusions 52a and a plurality of (three in FIG. 2) second supporting protrusions 52b disposed between the plurality of first supporting protrusions 52a. The circumferential width of the second supporting protrusions 52b is smaller than the circumferential width of the first supporting protrusions 52a. The first supporting protrusions 52a are in contact or abutment with respective abutting surfaces 55 (described below; see FIG. 3) of the second piston member 42. The second supporting protrusions 52b are disposed at circumferential positions different from the positions of the abutting surfaces 55 of the second piston member 42.

As illustrated in FIG. 2, the first piston member 40 is provided with wall portions 53 protruding outwardly toward the through-holes 47. The wall portions 53 are arranged at positions adjoining the recess portions 51 on a side remote from the second piston member 42 (member that is not provide with the through-holes 47) in the axial direction. The recess portions 51 are each provided with a plurality of ribs 51a reinforcing the wall portions 53. Each recess portion 51 is provided with the plurality of ribs 51a at intervals in the circumferential direction.

As illustrated in FIG. 3, the second lightening portion 46b has a plurality of (three in FIG. 3) bottomed grooves 54 having a depth in the axial direction, but does not have through-holes extending therethrough in the axial direction. The plurality of grooves 54 are arranged at intervals in the circumferential direction. Each groove 54 has an arc shape extending in the circumferential direction. Each groove 54 is provided with reinforcing ribs 54a. In each groove 54, the plurality of reinforcing ribs 54a are disposed at intervals in the circumferential direction.

In the second piston member 42, each of the abutting surfaces 55 brought into abutment with the end surfaces of the first supporting protrusions 52a of the first piston member 40 is formed between two circumferentially adjacent grooves 54. Since the second piston member 42 is provided with the abutting surfaces 55, the abutting surfaces 55 can receive a load from the first piston member 40 when the base end portion 20a of the piston rod 20 is crimped to secure the first piston member 40 and the second piston member 42 together. The second supporting protrusions 52b of the first piston member 40 are shifted in position from the abutting surfaces 55 in the circumferential direction and thus are not brought into contact with the abutting surfaces 55.

As illustrated in FIGS. 1 and 2, the first piston member 40 is provided with a plurality of positioning protrusions 56 protruding in the axial direction. In FIG. 2, the plurality of positioning protrusions 56 are disposed at intervals in the circumferential direction. As illustrated in FIGS. 1 and 3, the second piston member 42 is provided with a plurality of positioning recesses 57 recessed in the axial direction. In FIG. 3, the plurality of positioning recesses 57 are arranged at intervals in the circumferential direction. The positioning protrusions 56 are inserted in the respective positioning recesses 57.

Contrary to the above-described structure, the second piston member 42 may be provided with the positioning protrusions 56, and the first piston member 40 may be provided with the positioning recesses 57. Only one positioning protrusion 56 and the corresponding positioning recess 57 may be provided for the respective piston members. During an assembly process of the piston assembly 74 described below, the positioning protrusions 56 and the positioning recesses 57 prevent the first piston member 40 and the second piston member 42 from rotating relative to each other.

As illustrated in FIG. 2, an annular projection 50a is formed on the end surface of the protruding portion 50 of the first piston member 40. In the assembly process of the piston assembly 74 described below, the annular projection 50a is brought into abutment with the opposing end surface of the second piston member 42 and plastically deformed to thereby closely contact the opposing end surface. As a result, an airtight or liquid-tight sealing portion is formed. Thus, the gap between the first piston member 40 and the second piston member 42 is air-tightly or liquid-tightly sealed to thereby prevent pressurized fluid from flowing via the gap between the inner circumferential surface of the second piston member 42 and the outer circumferential surface of the piston rod 20.

The annular projection 50a for sealing may be formed on the second piston member 42. The annular projection 50a may be formed radially outside the positioning protrusions 56 and radially inside the supporting protrusions 52. Instead of providing the annular projection 50a on the first piston member 40 or the second piston member 42, an annular sealing member may be interposed between the first piston member 40 and the second piston member 42.

The packing 34 is a ring-shaped sealing member (for example, O-ring) composed of an elastic body mounted on an outer circumferential part of the second piston member 42. The packing 34 is installed in the packing mounting groove 36. The material of the packing 34 includes an elastic material such as rubber and elastomer. The outer diameter of the packing 34 is larger than the outer diameters of the wear ring 44 and the magnet 48 when the packing 34 is in a natural state (i.e., when not disposed inside the slide hole 13 and not elastically compressed radially inward) and when the packing 34 is disposed inside the slide hole 13.

The outer circumference of the packing 34 airtightly or liquid-tightly contacts closely the inner circumferential surface of the slide hole 13 over the entire circumference. The inner circumference of the packing 34 air-tightly or liquid-tightly contacts closely the outer circumferential surface of the second piston member 42 (outer circumferential surface of the packing supporting portion 42a) over the entire circumference. The packing 34 is elastically compressed radially between the inner circumferential surface of the slide hole 13 and the outer circumferential surface of the second piston member 42. The packing 34 seals the gap between the outer circumferential surface of the piston unit 18 and the inner circumferential surface of the slide hole 13, and airtightly or liquid-tightly separates the first pressure chamber 13a and the second pressure chamber 13b from each other inside the slide hole 13.

The wear ring 44 is a member that prevents the outer circumferential surface of the first piston member 40 from coming into contact with the inner circumferential surface of the slide hole 13 when a large lateral load is applied to the piston unit 18 in directions perpendicular to the axial direction while the fluid pressure cylinder 10A is operating. The wear ring 44 is a circular ring-shaped member mounted on an outer circumferential part of the first piston member 40 so as to surround the outer circumferential part of the first piston member 40.

In this embodiment, the wear ring 44 includes a radial portion 44a extending radially and an axial portion 44b extending in the axial direction. The difference in the inner diameter between the radial portion 44a and the axial portion 44b forms a stepped portion on the inner circumference of the wear ring 44. The stepped portion in the outer circumferential part of the first piston member 40 described above engages with the stepped portion of the wear ring 44.

The wear ring 44 is held between the large diameter section 40a1 of the first piston member 40 and the magnet 48.

The wear ring 44 is composed of a low friction material. The frictional coefficient between the wear ring 44 and the inner circumferential surface of the slide hole 13 is smaller than the frictional coefficient between the packing 34 and the inner circumferential surface of the slide hole 13. Such a low friction material includes, for example, synthetic resins with a low friction property and a high wear resistance such as polytetrafluoroethylene (PTFE) and metal materials (for example, bearing steel).

The magnet 48 is a circular ring-shaped member mounted on another outer circumferential part (the magnet supporting portion 40b) of the first piston member 40 so as to surround the outer circumferential part of the first piston member 40. A side of the magnet 48 remote from the wear ring 44 (one side located in the direction of the arrow X1) adjoins the packing 34 and is in abutment against a portion of the packing 34 on a side opposite to the one side. The magnet 48 is, for example, a ferrite magnet, rare earth magnet, or the like.

Magnetic sensors (not illustrated) are attached to the outer surface of the cylinder tube 12 at positions corresponding to both stroke ends of the piston unit 18. The magnetic sensors detect magnetism generated by the magnet 48 to thereby detect the working position of the piston unit 18.

A second damper 68 composed of an elastic member is attached to an end of the piston unit 18 that is remote from the head cover 14 (an end located in the direction of the arrow X1). The second damper 68 may be composed of a material similar to the material of the first damper 22. The second damper 68 has a circular ring shape and is disposed on the outer circumferential surface of the piston rod 20. The second damper 68 is disposed adjoining a side of the second piston member 42 that is located in the direction of the arrow X1. That is, the second damper 68 is stacked on the second piston member 42 in the axial direction. During operation of the fluid pressure cylinder 10A (while the piston unit 18 is reciprocating), the second damper 68 may be separate from the second piston member 42.

The fluid pressure cylinder 10A may exclude one of the first damper 22 and the second damper 68 or may exclude both of the first damper 22 and the second damper 68. The first damper 22 may be attached to the piston unit 18.

The piston rod 20 is a pillar-shaped (cylindrical) member extending in the axial direction of the slide hole 13. The piston rod 20 includes a rod body 20c passing through the rod cover 16 and an insertion shaft portion 20d having a diameter smaller than the diameter of the base end portion (end portion located in the direction of the arrow X2) of the rod body 20c and which protrudes in the axial direction. The difference in the outer diameter between the rod body 20c and the insertion shaft portion 20d forms a locking shoulder 20e. The insertion shaft portion 20d is inserted into the first piston member 40 and the second piston member 42, and then the first piston member 40 and the second piston member 42 are stacked in the axial direction. In this state, the first piston member 40 and the second piston member 42 are attached and secured to the insertion shaft portion 20d.

As illustrated in FIG. 1, a crimped portion 66 with a diameter increased radially outward is formed at an end part of the insertion shaft portion 20d (opposite end part remote from the rod body 20c). The crimped portion 66 is formed by plastically deforming the base end portion 20a of the piston rod 20. The crimped portion 66 engages with a tapered portion 40c formed in the inner circumferential edge of the first piston member 40 to thereby secure the first piston member 40 and the second piston member 42 to the piston rod 20.

The piston rod 20 passes through the rod cover 16. A distal end portion 20b, which is the opposite end of the base end portion 20a of the piston rod 20, is exposed to the outside of the slide hole 13.

The material of the piston rod 20 includes, for example, the material of the first piston member 40 (such as carbon steel). The piston rod 20 may be composed of a material identical to or different from the material of the first piston member 40.

Next, a method of assembling the piston assembly 74 configured as above will be described.

In an assembly process (FIGS. 4A to 4G), the second damper 68, the second piston member 42, the packing 34, the magnet 48, the wear ring 44, and the first piston member 40 described above are moved in the axial direction on the piston rod 20, and are then assembled to the piston rod 20. Thus, the piston assembly 74 is obtained.

Specifically, in the assembly process, as illustrated in FIG. 4A, first, the second damper 68 is moved toward the distal end portion 20b of the piston rod 20 such that the piston rod 20 is inserted into the second damper 68. In this case, for example, as illustrated in FIG. 4A, the piston rod 20 is held such that the base end portion 20a of the piston rod 20 faces upward, and the second damper 68 is lowered and then mounted on the piston rod 20.

Next, as illustrated in FIG. 4B, the second piston member 42 is moved (lowered) to thereby insert the insertion shaft portion 20d of the piston rod 20 into the rod insertion hole 43 of the second piston member 42. At this time, the second piston member 42 is locked by the locking shoulder of the piston rod 20.

Next, as illustrated in FIG. 4C, the packing 34 is moved (lowered) in the axial direction of the piston rod 20 and then mounted on the packing supporting portion 42a of the second piston member 42. In this case, unlike a conventional assembly method of mounting a packing in a packing mounting groove formed by cutting, the packing 34 can be easily mounted on the outer circumferential part of the second piston member 42 without the need to pull the packing radially outward for an increase in diameter.

Next, as illustrated in FIGS. 4D to 4F, the magnet 48, the wear ring 44, and the first piston member 40 are sequentially moved (lowered) in the axial direction of the piston rod 20. This causes the magnet 48 and the second piston member 42 to be stacked on the first piston member 40, and further causes the magnet 48 and the wear ring 44 to be mounted on the outer circumferential part of the first piston member 40.

In this case, as illustrated in FIG. 4F, the positioning protrusions 56 on the first piston member 40 are inserted into the positioning recesses 57 formed in the second piston member 42. This causes the end surfaces of the first supporting protrusions 52a of the first piston member 40 (see also FIG. 2) to come into abutment with the respective abutting surfaces 55 of the second piston member 42 (see also FIG. 3). In this state, the engagement of the positioning protrusions 56 and the positioning recesses 57 prevents the first piston member 40 and the second piston member 42 from rotating relative to each other. Thus, the end surfaces of the first supporting protrusions 52a and the abutting surfaces 55 remain in abutment with each other.

As illustrated in FIG. 4F, the magnet 48 is stacked on the second piston member 42 to thereby form the packing mounting groove 36, and thus the packing 34 is mounted in the packing mounting groove 36.

In a conventional assembly method, a deformable magnet with a gap is expanded and installed in an exclusive groove, and then the gap is closed with adhesive. In contrast, according to this embodiment, the annular magnet 48 can be mounted on the second piston member 42 without the need to change the annular shape.

When the assembly process proceeds to the state illustrated in FIG. 4F, the base end portion 20a of the piston rod 20 is pressed and plastically deformed to thereby increase the diameter of the base end portion 20a. This creates the crimped portion 66 (see FIG. 1). As a result, the first piston member 40 and the second piston member 42 are firmly fastened together in the axial direction.

In this case, the end surfaces of the first supporting protrusions 52a of the first piston member 40 are in abutment against the abutting surfaces 55 of the second piston member 42, and thus the abutting surfaces 55 can receive the load applied when the base end portion 20a of the piston rod 20 is crimped (i.e., when the crimped portion 66 is formed). Consequently, although the second piston member 42 has the plurality of grooves 54 serving as the second lightening portion 46b, no large load is locally applied on the second piston member 42, and the second piston member 42 is therefore prevented from being damaged or undesirably deformed.

The annular projection 50a (see FIG. 2) formed on the first piston member 40 is pressed against the opposing end surface of the second piston member 42 by the load applied when the base end portion 20a of the piston rod 20 is crimped to thereby fasten the first piston member 40 and the second piston member 42 together in the axial direction. Thus, the annular projection 50a is plastically deformed and compressed in the axial direction, resulting in formation of a liquid-tight or airtight seal on the contact area between the annular projection 50a and the end surface of the second piston member 42.

In this manner, assembling of the piston assembly 74 is completed.

Next, the effects and advantages of the above-configured fluid pressure cylinder 10A illustrated in FIG. 1 will be described. In the fluid pressure cylinder 10A, the piston unit 18 is moved inside the slide hole 13 in the axial direction by action of pressurized fluid (for example, compressed air) introduced via the first port 12a or the second port 12b. This causes the piston rod 20 connected to the piston unit 18 to reciprocate.

Specifically, in order to displace (advance) the piston unit 18 toward the rod cover 16, the pressurized fluid is supplied from a pressurized fluid supply source (not illustrated) to the first pressure chamber 13a via the first port 12a while the second port 12b is open to the atmosphere. As a result, the pressurized fluid pushes the piston unit 18 toward the rod cover 16. Then, the piston unit 18 is displaced (advanced) toward the rod cover 16 together with the piston rod 20.

When the second damper 68 comes into contact with the end surface of the rod cover 16, the advancing motion of the piston unit 18 is stopped. In this case, the second damper 68 composed of an elastic material prevents the piston unit 18 and the rod cover 16 from coming into direct contact with each other. Thus, impact and impact noise occurring when the piston unit 18 reaches the advanced position (stroke end on the rod cover 16 side) are effectively prevented or reduced.

On the other hand, in order to displace (retract) the piston unit 18 toward the head cover 14, the pressurized fluid is supplied from the pressurized fluid supply source (not illustrated) to the second pressure chamber 13b via the second port 12b while the first port 12a is open to the atmosphere. As a result, the pressurized fluid pushes the piston unit 18 toward the head cover 14. Thus, the piston unit 18 is displaced toward the head cover 14.

When the piston rod 20 and the first piston member 40 come into contact with the first damper 22 (expanding portion 23), the retracting motion of the piston unit 18 is stopped. In this case, the first damper 22 composed of an elastic material prevents the piston unit 18 and the head cover 14 from coming into direct contact with each other. Thus, impact and impact noise occurring when the piston unit 18 reaches the retracted position (stroke end on the head cover 14 side) are effectively prevented or reduced.

In this case, the fluid pressure cylinder 10A has the packing mounting groove 36 formed by a combination of the plurality of members (the second piston member 42 and the magnet 48). This leads to an increase in productivity, compared with a case where a groove in which the packing 34 is mounted is formed by grooving (cutting). Moreover, the first piston member 40 and the second piston member 42 are shaped by casting or injection molding, and thus it is possible to significantly reduce the amount of material used for the fluid pressure cylinder, compared with a case of adopting a grooving process. Therefore, the present invention is economical and can achieve resource savings.

For installing the packing 34 into a groove formed by grooving, the packing 34 needs to be elastically deformed such that the diameter is increased compared with the diameter of the groove, before being mounted. Thus, it is difficult to automate (integrate into an automatic assembly process performed by robots) the process of mounting the packing 34 into the groove formed by such grooving. In contrast, the piston unit 18 has the packing mounting groove 36 formed by a combination of the plurality of members or components, and the packing 34 can be mounted on the piston body 38 without the need to increase the diameter of the packing 34 in the assembly process. Consequently, the process of mounting the packing can be easily automated using robots.

Moreover, as described above, the members other than the packing 34 can also be assembled to the piston rod 20 by moving the members in the axial direction relative to the piston rod 20 with the first piston member 40 mounted thereon and stacking them together. Consequently, the process of assembling the piston unit 18 (piston assembly 74) can be easily automated, leading to an increase in productivity.

Furthermore, the first piston member 40 and the second piston member 42 are, for example, shaped by casting, and the first piston member 40 and the second piston member 42 are each provided with a lightening portion 46. This leads to a significant reduction in the amount of material to be used, compared with a conventional piston having a packing mounting groove formed by cutting and not having a lightening portion. Thus, the piston assembly is economical and can achieve resource savings. Moreover, the formation of the lightening portion 46 makes it possible to achieve a reduction in weight of the piston unit 18, and thus it is possible to achieve a reduction in consumption of the pressurized fluid. This advantageously leads to energy savings.

In addition, in this embodiment, the first piston member 40 has the through-holes 47 extending therethrough in the axial direction, as the first lightening portion 46a, and the second piston member 42 has the grooves 54 with a depth in the axial direction, as the second lightening portion 46b. Thus, a volume of the lightening portions 46 can be set to be larger, and the weight of the piston unit 18 can be further reduced. In particular, since plural through-holes 47 and plural grooves 54 are formed, the weight of the piston unit 18 can be significantly reduced.

Furthermore, in this embodiment, the first piston member 40 includes the protruding portion 50 protruding toward the second piston member 42, and the recess portions 51 recessed inward and constituting part of the through-holes 47 are formed in the outer circumference of the protruding portion 50. The supporting protrusions 52 supporting the magnet 48 are disposed on the outer circumference of the protruding portion 50 at the circumferential positions different from the positions of the recess portions 51. Thus, a volume of the lightening portions 46 is efficiently set to be larger while the magnet 48 is suitably supported.

In this embodiment, the first piston member 40 is provided with the wall portions 53 protruding outwardly toward the through-holes 47. The first damper 22 comes into abutment against the wall portions 53 when the piston unit 18 reaches the stroke end on the head cover 14 side. Thus, the shock absorbing function of the first damper 22 can be suitably fulfilled. In particular, since the recess portions 51 of the first piston member 40 are provided with the ribs 51a reinforcing the wall portions 53, the strength of the wall portions 53 can be suitably enhanced while a volume of the lightening portion 46 is set to be larger.

In this embodiment, the end surfaces of the first supporting protrusions 52a of the first piston member 40 are in abutment with the abutting surfaces 55, each disposed between two circumferentially adjacent grooves 54, of the second piston member 42. Thus, in the assembly process of the piston assembly 74, the abutting surfaces 55 can receive part of the load from the first piston member 40 when the base end portion 20a of the piston rod 20 is crimped to thereby fasten the first piston member 40 and the second piston member 42 together in the axial direction. In particular, since the first piston member 40 and the second piston member 42 are respectively provided with the positioning protrusions 56 and the positioning recesses 57, the end surfaces of the first supporting protrusions 52a can be easily and reliably brought into contact with the abutting surfaces 55 in the assembly process of the piston assembly 74.

In the above-described piston unit 18, the first piston member 40 has, as the lightening portion 46, the through-holes 47 extending therethrough in the axial direction, and the second piston member 42 has, as the lightening portion 46, the grooves 54 having a depth in the axial direction. However, the through-holes 47 and the grooves 54 may be arranged in an opposite manner. That is, the first piston member 40 may be provided with grooves (not illustrated) having a depth in the axial direction, and the second piston member 42 may be provided with through-holes (not illustrated) extending therethrough in the axial direction.

The fluid pressure cylinder 10A described above adopts the piston assembly 74 provided with the piston rod 20 protruding toward only one side of the piston unit 18. However, as illustrated in FIGS. 5A to 5C, the fluid pressure cylinder 10A may adopt piston assemblies 74a to 74c respectively provided with piston rods 71, 72, and 75 protruding toward both sides of piston units 18a and 18b.

Figure 5A:
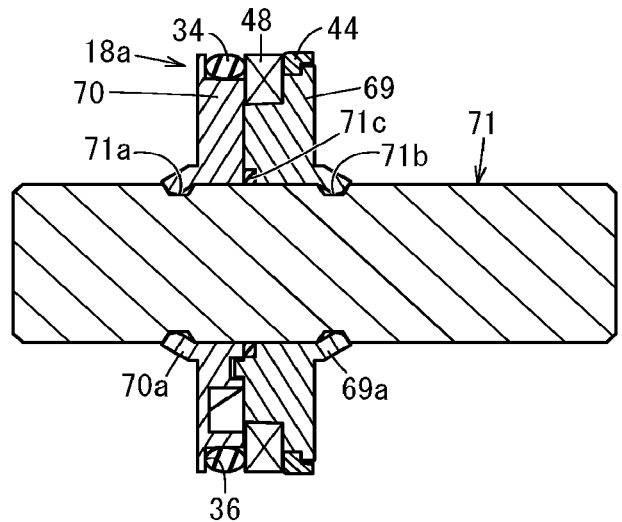
FIG. 5A is a diagram illustrating a first example structure of a piston assembly provided with a piston rod protruding toward both sides.

In the piston assembly 74a illustrated in FIG. 5A, the piston rod 71 has a solid structure, and the piston unit 18a is secured to the piston rod 71 by crimping a first piston member 69 and a second piston member 70. Specifically, the first piston member 69 includes a first protruding portion 69a disposed on the inner circumference and protruding in the axial direction. The second piston member 70 includes a second protruding portion 70a disposed on the inner circumference and protruding in the axial direction.

In a state where the first piston member 69 and the second piston member 70 are stacked in the axial direction, the first protruding portion 69a and the second protruding portion 70a are crimped radially inward to thereby secure the first piston member 69 and the second piston member 70 to the piston rod 71. The piston rod 71 has engaging grooves 71a, 71b with which the crimped first protruding portion 69a and the crimped second protruding portion 70a engage. A ring-shaped gasket 71c is interposed between the first piston member 69, the second piston member 70, and the piston rod 71.

Figure 5B:
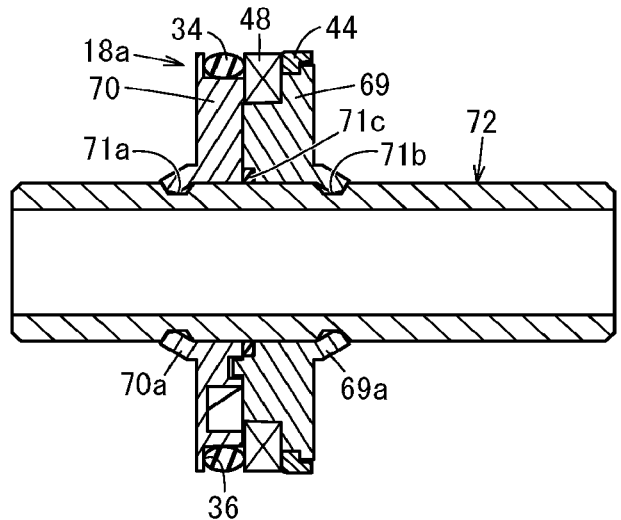
FIG. 5B is a diagram illustrating a second example structure of a piston assembly provided with a piston rod protruding toward both sides.
Figure 5C:
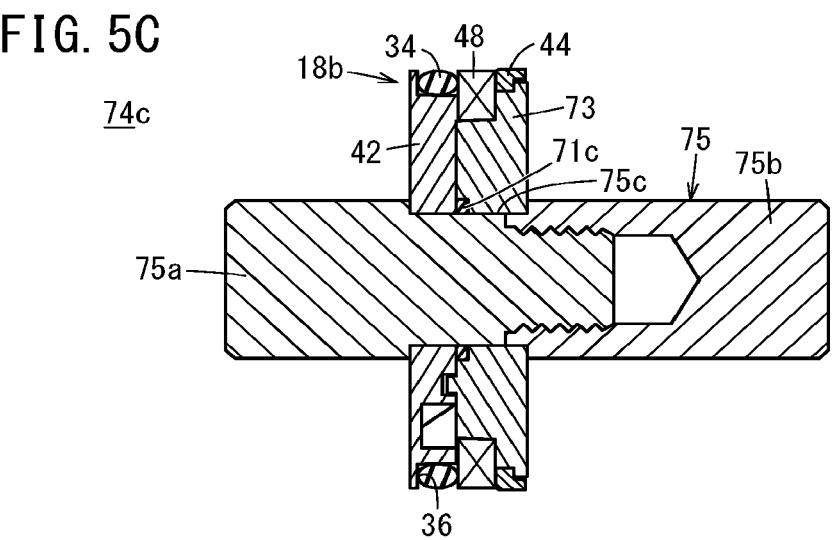
FIG. 5C is a diagram illustrating a third example structure of a piston assembly provided with a piston rod protruding toward both sides.

In the piston assembly 74b illustrated in FIG. 5B, the piston rod 72 has a hollow structure, and the piston unit 18a is secured to the piston rod 72 by crimping the first piston member 69 and the second piston member 70.

In the piston assembly 74c illustrated in FIG. 5C, the piston rod 75 includes a first rod portion 75a and a second rod portion 75b connected with each other by screw-engagement. The first rod portion 75a and the second rod portion 75b connected with each other form an annular securing groove 75c in an outer circumferential part of the piston rod 75. The piston unit 18b is secured to the annular securing groove 75c while a first piston member 73 and the second piston member 42 are stacked in the axial direction. The ring-shaped gasket 71c is interposed between the first piston member 73, the second piston member 42, and the first rod portion 75a.

Although not illustrated in detail, other example structures of the piston assembly provided with the piston rod protruding toward both sides of the piston unit may include a piston assembly provided with the piston unit 18 joined by, for example, welding, bonding, or brazing to the piston rod at the middle position in the axial direction.

In addition to the structures described above, the piston unit 18 may adopt various structures such as piston units 18c to 18f illustrated in FIGS. 6A to 7B. In the above-described structures also, the piston units 18c to 18f each with the packing 34 mounted thereon can be assembled by stacking the plurality of components in the axial direction. The piston units 18a to 18f may also be adopted in fluid pressure cylinders 10B to 10F according to second to sixth embodiments described below.

Figure 6A:
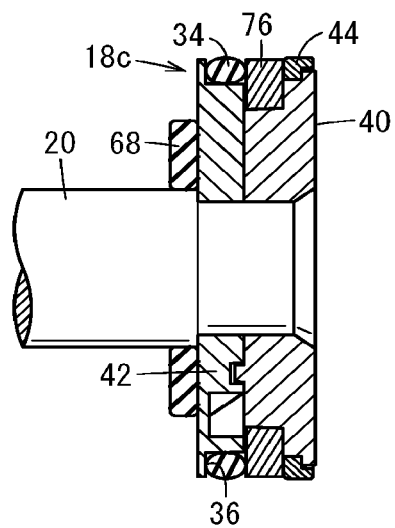
FIG. 6A is a diagram illustrating a piston unit including a spacer instead of a magnet.

In the piston unit 18c illustrated in FIG. 6A, the spacer 76 is disposed adjoining the packing 34, instead of the magnet 48 (see FIG. 1). Thus, the second piston member 42 and the spacer 76 jointly form the packing mounting groove 36 in the piston unit 18c. In the case illustrated in FIG. 6A, the spacer 76 has a quadrangular cross-section.

Figure 6B:
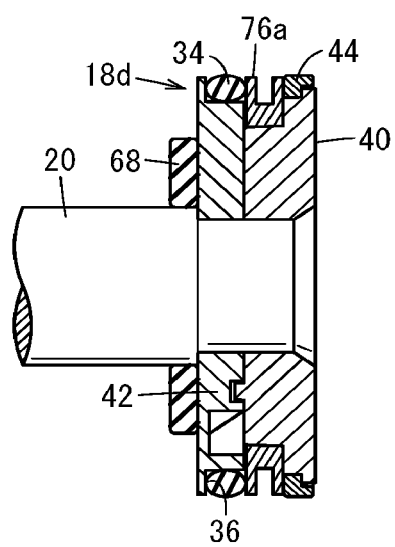
FIG. 6B is a diagram illustrating a piston unit including another spacer instead of the magnet.

In the piston unit 18d illustrated in FIG. 6B, the spacer 76a having a different shape is disposed adjoining the packing 34. Thus, the second piston member 42 and the spacer 76a jointly form the packing mounting groove 36 in the piston unit 18d. In the case illustrated in FIG. 6B, the spacer 76a has a square U-shaped cross-section.

Figure 7A:
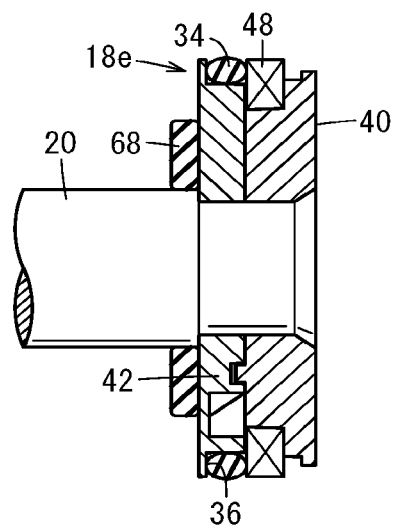
FIG. 7A is a diagram illustrating a piston unit from which a wear ring is omitted.
Figure 7B:
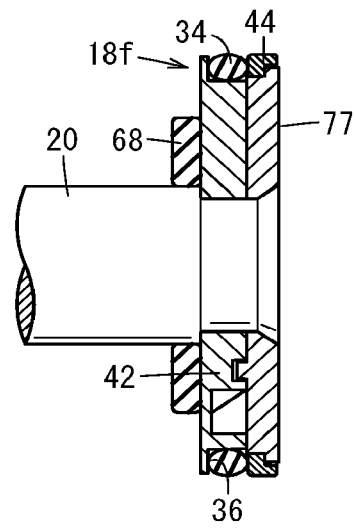
FIG. 7B is a diagram illustrating a piston unit from which the magnet is omitted.

In the piston unit 18e illustrated in FIG. 7A, the wear ring 44 (see FIG. 1) is omitted. In the piston unit 18f illustrated in FIG. 7B, the magnet 48 (see FIG. 1) is omitted. In this case, a first piston member 77 illustrated in FIG. 7B does not include a portion corresponding to the magnet supporting portion 40b of the first piston member 40 described above, and, accordingly, the thickness in the axial direction is reduced compared with the thickness of the first piston member 40.

Figure 8:
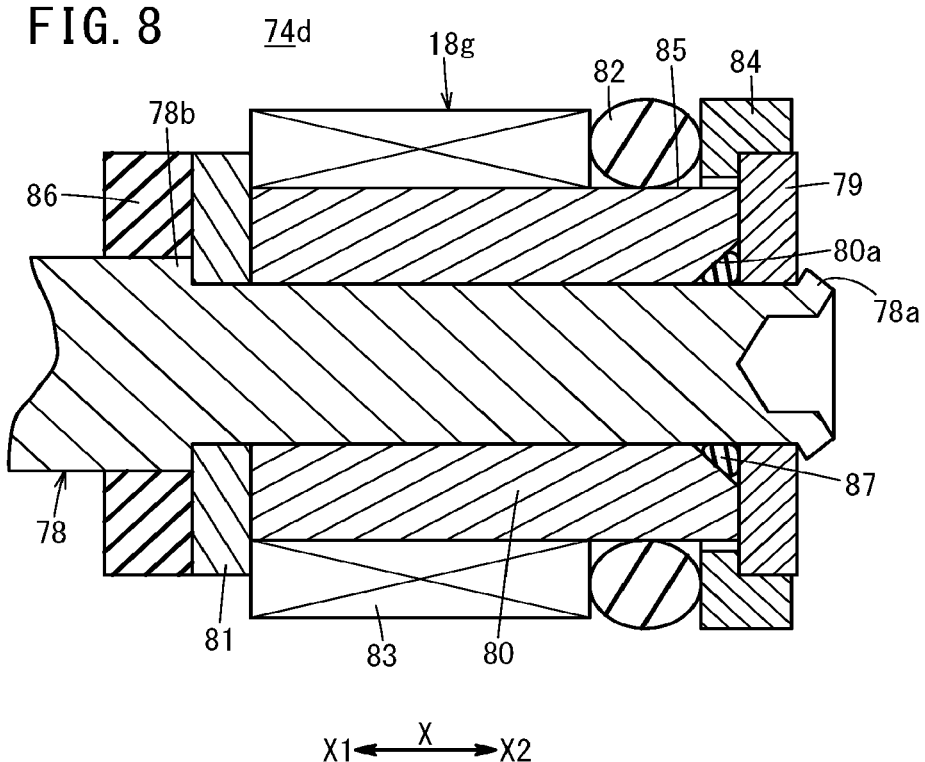
FIG. 8 is a diagram illustrating a piston assembly with a diameter smaller than the diameter of the piston assembly illustrated in FIG. 1.

The fluid pressure cylinders according to the other embodiments of the fluid pressure device of the present invention may adopt a piston assembly 74d illustrated in FIG. 8. The piston assembly 74d includes a piston rod 78 and a piston unit 18g with smaller diameters compared with the piston assembly 74 described above. In the piston assembly 74d, a first piston member 79, a second piston member 80, and a yoke 81 all having a ring shape are stacked in the axial direction and are fastened and secured to each other in the axial direction by a crimped portion 78a formed at the base end portion of the piston rod 78.

Although not illustrated in detail, the first piston member 79 and the second piston member 80 are each provided with a lightening portion having a depth in the axial direction, as in the first piston member 40 and the second piston member 42. The lightening portions include a first lightening portion provided for the first piston member 79 and a second lightening portion provided for the second piston member 80. As in the first lightening portion 46a (see FIG. 2), the first lightening portion of the first piston member 79 has a plurality of through-holes extending therethrough in the axial direction, and the through-holes are disposed at intervals in the circumferential direction. As in the second lightening portion 46b (see FIG. 3), the second lightening portion of the second piston member 80 has a plurality of bottomed grooves having a depth in the axial direction, and the grooves are disposed at intervals in the circumferential direction. Contrary to the above-described structure, the first piston member 79 may be provided with the bottomed grooves, and the second piston member 80 may be provided with the through-holes.

The outer circumference of the second piston member 80 has a fixed diameter in the axial direction, and a packing 82 and a magnet 83 both having a ring shape are disposed on the outer circumference of the second piston member 80. The magnet 83 is disposed adjoining the packing 82 and is closer to the distal end (end located in the direction of the arrow X1) of the piston rod 78 than the packing 82 is. Consequently, the packing 82 is disposed between a wear ring 84 and the magnet 83. The second piston member 80, the wear ring 84, and the magnet 83 jointly form a packing mounting groove 85. The packing 82 is mounted in the packing mounting groove 85.

The yoke 81 is a ring-shaped member composed of a magnetic body such as rolled steel and is locked by a locking shoulder 78b of the piston rod 78. A second damper 86 composed of an elastic member is disposed on an outer circumferential part of the piston rod 78 and adjoining the yoke 81. Although not illustrated, the fluid pressure cylinder provided with the piston assembly 74d includes a first damper composed of an elastic member attached to the inner surface of the head cover. The first damper may be attached to the first piston member 79.

The crimped portion 78a formed by increasing the diameter at the base end portion of the piston rod 78 engages with the inner circumferential edge of the first piston member 79. The second piston member 80 is provided with a tapered portion 80a at the inner circumferential end closer to the first piston member 79. A ring-shaped gasket 87 composed of an elastic member is interposed between the tapered portion 80a, the first piston member 79, and the piston rod 78.

In the above-described structure of the piston assembly 74d also, it is possible to assemble the piston unit 18g having the packing 82 mounted in the packing mounting groove 85 by stacking the plurality of components in the axial direction. Consequently, the piston assembly 74d yields advantageous effects similar to those of the piston assembly 74.

Next, the fluid pressure cylinders 10B to 10F respectively according to the second to sixth embodiments will be described.

Figure 9:
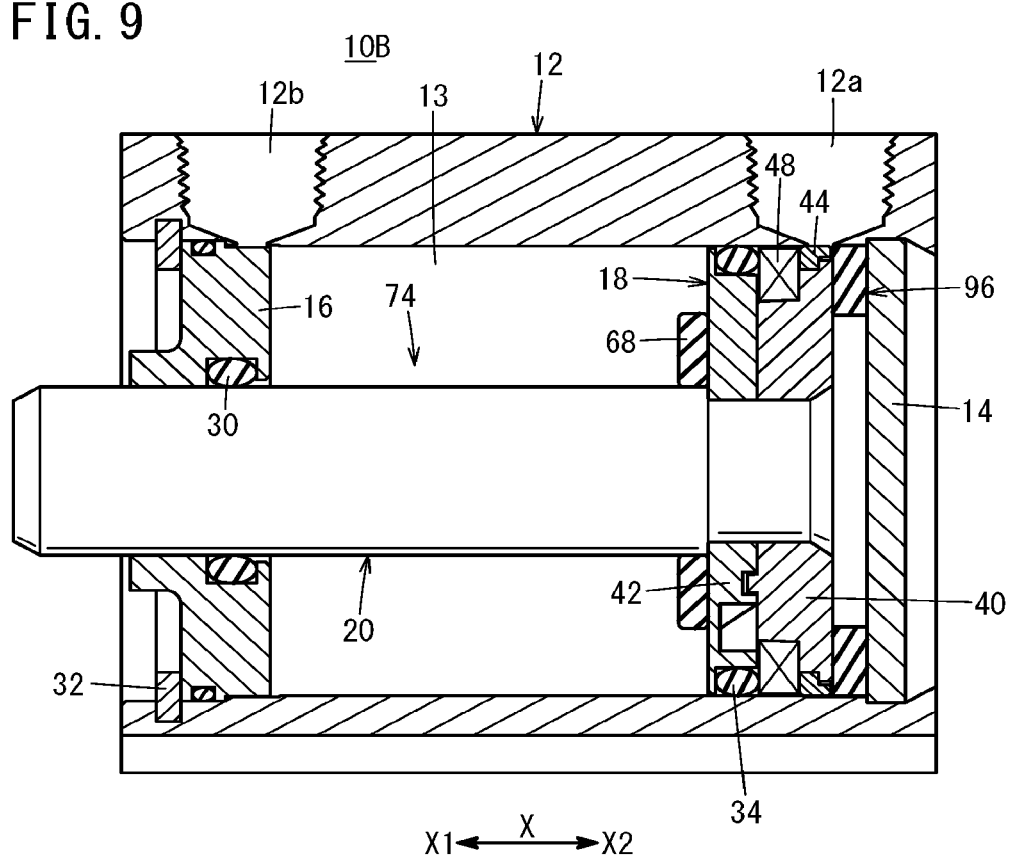
FIG. 9 is a cross-sectional view of a fluid pressure cylinder according to a second embodiment of the present invention.

The fluid pressure cylinder 10B according to the second embodiment illustrated in FIG. 9 adopts a first damper 96, having a structure different from the structure of the first damper 22 in the fluid pressure cylinder 10A illustrated in FIG. 1, instead of the first damper 22. As is the first damper 22, the first damper 96 is composed of an elastic material such as rubber. The structure of the fluid pressure cylinder 10B is identical to the structure of the fluid pressure cylinder 10A except for the first damper 96.

The first damper 96 prevents or reduces impact and impact noise generated by abutment against the piston unit 18 when the piston unit 18 moves in the direction of the arrow X2 and then reaches the retracted position. The first damper 96 has a ring shape and is attached to the inner wall surface 14a of the head cover 14.

The inner diameter of the first damper 96 is larger than the outer diameter of the piston rod 20. The outer diameter of the first damper 96 is substantially identical to the outer diameter of the piston unit 18. Thus, the first damper 96 has a larger effective volume compared with the first damper 22 illustrated in FIG. 1. Consequently, the first damper 96 more effectively prevents or reduces impact and impact noise occurring when the piston unit 18 reaches the retracted position.

Figure 10:
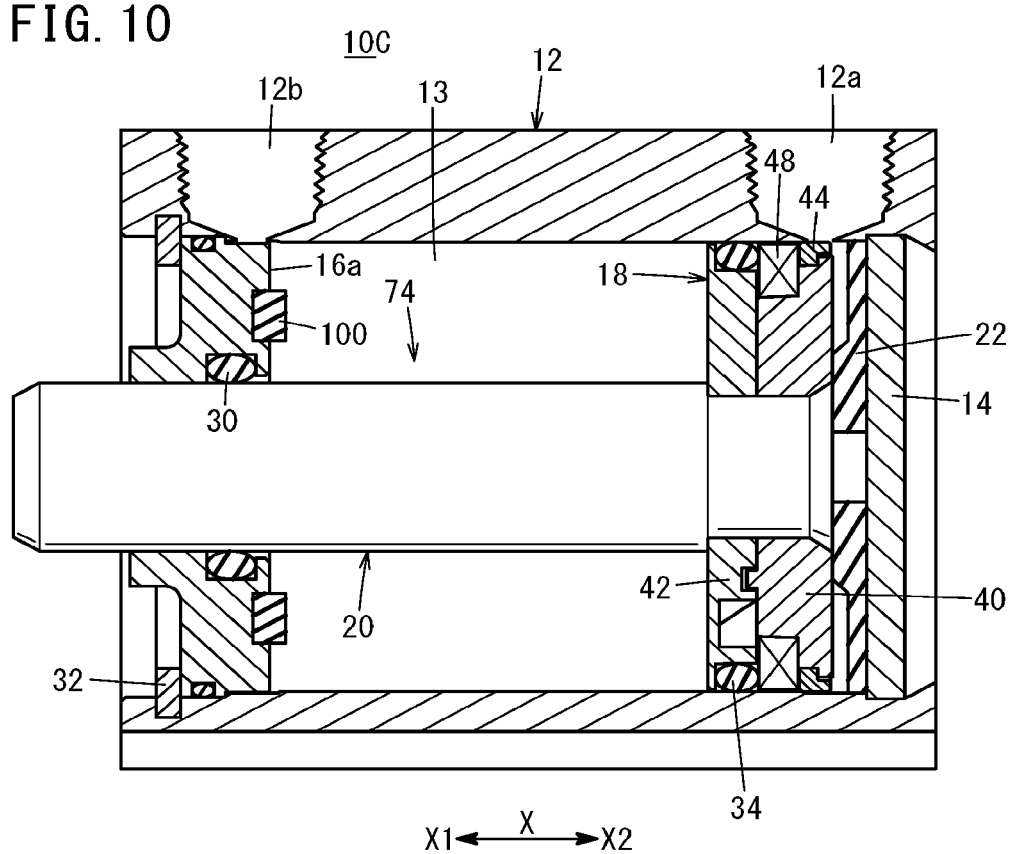
FIG. 10 is a cross-sectional view of a fluid pressure cylinder according to a third embodiment of the present invention.

The fluid pressure cylinder 10C according to the third embodiment illustrated in FIG. 10 has a second damper 100 on a surface 16a of the rod cover 16 facing the piston unit 18, instead of the second damper 68 provided on the piston unit 18 in the fluid pressure cylinder 10A illustrated in FIG. 1. The second damper 100 prevents or reduces impact and impact noise by coming into contact with the piston unit 18 when the piston unit 18 moves in the direction of the arrow X1 and then reaches the advanced position. The structure of the fluid pressure cylinder 10C other than this is identical to the structure of the fluid pressure cylinder 10A.

Figure 11:
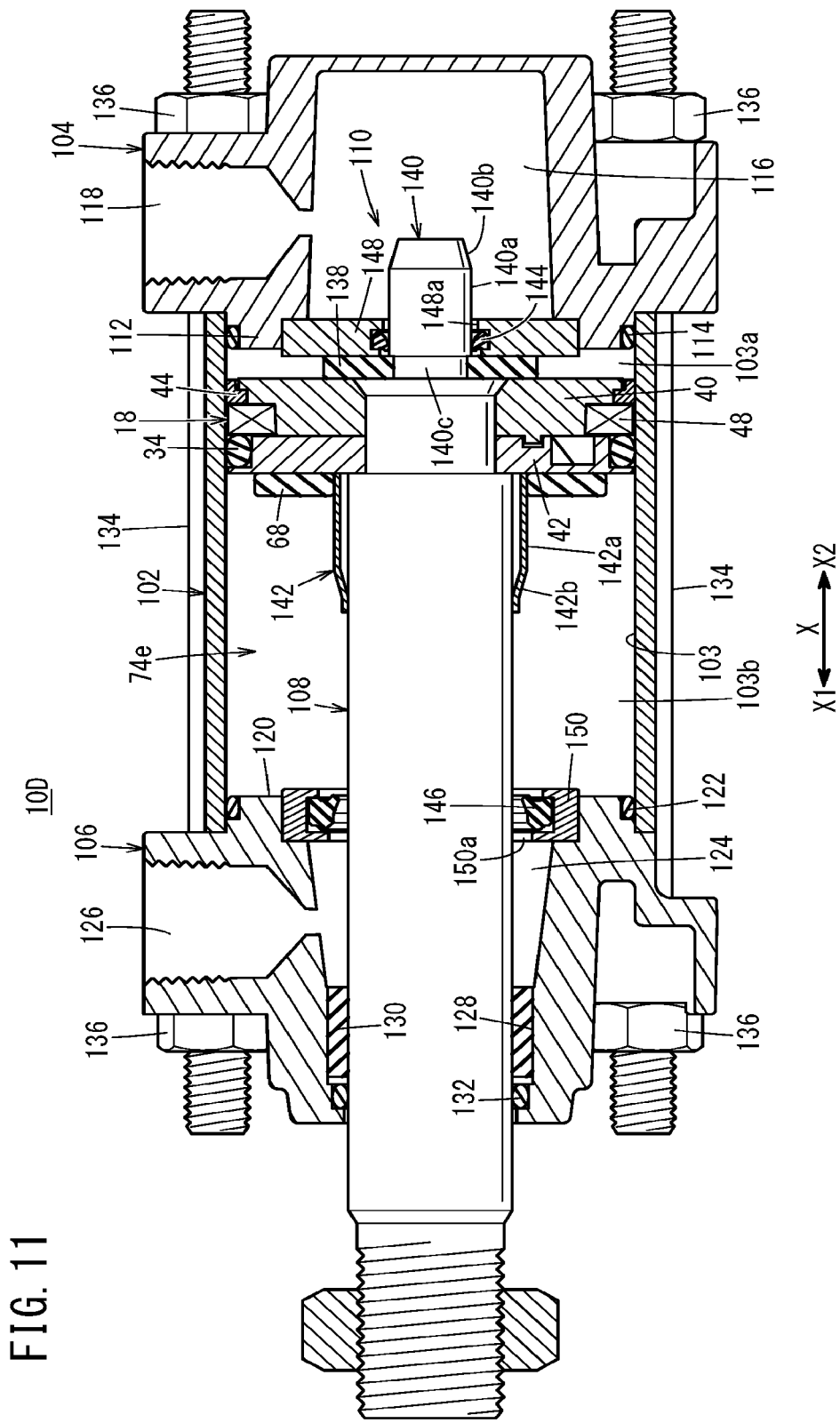
FIG. 11 is a cross-sectional view of a fluid pressure cylinder according to a fourth embodiment of the present invention.

The fluid pressure cylinder 10D according to the fourth embodiment illustrated in FIG. 11 is provided with a cylinder tube 102 (body) having a hollow cylindrical shape, a head cover 104 disposed at one end portion of the cylinder tube 102, and a rod cover 106 disposed at another end portion of the cylinder tube 102. The fluid pressure cylinder 10D is further provided with the piston unit 18 disposed inside the cylinder tube 102 so as to be movable in the axial direction (direction of the arrow X), a piston rod 108 connected to the piston unit 18, and a cushioning mechanism 110 relieving impact at one stroke end and the other stroke end of the piston unit 18.

The cylinder tube 102 has a cylindrical shape. A slide hole 103 (cylinder chamber) accommodating the piston unit 18 and which is closed by the head cover 104 and the rod cover 106, is formed inside the cylinder tube 102.

The head cover 104 includes a ring-shaped first stepped portion 112 protruding in the direction of the arrow X1, and the first stepped portion 112 is inserted into an end portion of the cylinder tube 102 located in the direction of the arrow X2. A gasket 114 is interposed between the outer circumference of the first stepped portion 112 and the cylinder tube 102. A first central hollow portion 116 and a first port 118 communicating with the first central hollow portion 116 are formed in the head cover 104. Pressurized fluid is supplied and discharged via the first port 118.

The rod cover 106 includes a ring-shaped second stepped portion 120 protruding in the direction of the arrow X2, and the second stepped portion 120 is inserted into an end portion of the cylinder tube 102 located in the direction of the arrow X1. A gasket 122 is interposed between the outer circumference of the second stepped portion 120 and the cylinder tube 102. A second central hollow portion 124 and a second port 126 communicating with the second central hollow portion 124 are formed in the rod cover 106. Pressurized fluid is supplied and discharged via the second port 126.

A rod hole 128 is formed in the second central hollow portion 124 at an inner circumferential part of the rod cover 106 in the direction of the arrow X1. A ring-shaped bush 130 guiding the piston rod 108 in the axial direction is disposed inside the rod hole 128. In addition, inside the rod hole 128, a packing 132 is disposed adjoining a side of the bush 130 located in the direction of the arrow X1. The packing 132 hermetically contacts the outer circumferential surface of the piston rod 108.

The cylinder tube 102, the head cover 104, and the rod cover 106 described above are fastened together in the axial direction by a plurality of connecting rods 134 and nuts 136. Thus, the cylinder tube 102 is secured while being supported and sandwiched between the head cover 104 and the rod cover 106.

The piston unit 18 is configured in a manner similar to the piston unit 18 in the first embodiment. The second damper 68 is disposed on an end of the piston unit 18 closer to the rod cover 106. A first damper 138 is disposed on an end of the piston unit 18 closer to the head cover 104. Details of the first damper 138 will be described later.

The cushioning mechanism 110 includes a first cushioning member 140 and a second cushioning member 142 (cushion ring) provided on a movable part (the piston rod 108), and also includes a ring-shaped first cushion seal 144 and a ring-shaped second cushion seal 146 composed of elastic members and provided on a fixed part (the head cover 104 and the rod cover 106).

The first cushioning member 140 is disposed at an end of the piston rod 108 located in the direction of the arrow X2 to be coaxial with the piston rod 108. Specifically, the first cushioning member 140 has a diameter smaller than the diameter of the piston rod 108 and protrudes from an end surface of the piston rod 108 in the direction of the arrow X2. The first cushioning member 140 has a hollow or solid cylindrical shape. The outer diameter of the first cushioning member 140 may be identical to or larger than the outer diameter of the piston rod 108.

The first cushioning member 140 may be a part integrated with the piston rod 108 or may be a separate part joined to the piston rod 108. In the case where the first cushioning member 140 is a part separate from the piston rod 108, the first cushioning member 140 may be joined to the piston rod 108 by joining means such as welding, bonding, and screwing.

The first cushioning member 140 includes a straight portion 140a and a tapered portion 140b on the outer circumference. The straight portion 140a has a fixed outer diameter in the axial direction. The tapered portion 140b is disposed adjoining an end of the straight portion 140a remote from the piston rod 108 (a side located in the direction of the arrow X2) and has a diameter gradually reducing in a direction away from the piston rod 108. The tapered portion 140b is an outer circumferential part of a free end portion of the first cushioning member 140.

A reduced-diameter portion 140c with a diameter smaller than the diameter of the straight portion 140a is formed at a base part (fixed end) of the first cushioning member 140. The reduced-diameter portion 140c forms an annular recess between the first cushioning member 140 and the piston rod 108. The annular recess engages with the inner circumference of the ring-shaped first damper 138 composed of an elastic member to thereby hold the first damper 138.

The first cushion seal 144 is held by the inner circumference of a ring-shaped first holder 148. The first holder 148 has a hole 148a passing through the first holder 148 in the axial direction and is secured to the inner circumference of the first stepped portion 112 of the head cover 104. When the first cushioning member 140 is not inserted into the hole 148a of the first holder 148, the slide hole 103 and the first central hollow portion 116 communicate with each other via the hole 148a.

The first cushion seal 144 protrudes inward from the inner circumferential surface of the first holder 148 defining the hole 148a. Thus, when the first cushioning member 140 is inserted into the hole 148a of the first holder 148, the first cushion seal 144 is brought into sliding contact with the outer circumferential surface of the first cushioning member 140 over the entire circumference.

The second cushioning member 142 is disposed next to a side of the piston unit 18 closer to the rod cover 106 (a side located in the direction of the arrow X1) to be coaxial with the piston rod 108 in the vicinity of the piston unit 18. The second cushioning member 142 is a ring-shaped member with a diameter larger than the diameter of the piston rod 108 and smaller than the diameter of the piston unit 18, and is joined to the outer circumferential surface of the piston rod 108 by, for example, welding or bonding. In FIG. 11, the outer diameter of the second cushioning member 142 is slightly larger than the outer diameter of the piston rod 108.

The second cushioning member 142 includes a straight portion 142a and a tapered portion 142b on the outer circumference. The straight portion 142a has a fixed outer diameter in the axial direction. The tapered portion 142b is disposed adjoining an end of the straight portion 142a located in the direction of the arrow X1 (a side closer to the rod cover 106) and has a diameter gradually reducing in the direction of the arrow X1.

The second cushion seal 146 is held by the inner circumference of a ring-shaped second holder 150. The second holder 150 has a hole 150a passing through the second holder 150 in the axial direction and is secured to the inner circumference of the second stepped portion 120 of the rod cover 106. When the second cushioning member 142 is not inserted into the hole 150a of the second holder 150, the slide hole 103 and the second central hollow portion 124 communicate with each other via the hole 150a.

The second cushion seal 146 protrudes inward from the inner circumferential surface of the second holder 150 defining the hole 150a. Thus, when the second cushioning member 142 is inserted into the hole 150a of the second holder 150, the second cushion seal 146 is brought into sliding contact with the outer circumferential surface of the second cushioning member 142 over the entire circumference.

Next, the operation of the fluid pressure cylinder 10D configured as above will be described. In the description below, air (compressed air) will be used as pressurized fluid. However, gas other than air may be used.

In the fluid pressure cylinder 10D, the piston unit 18 is moved inside the slide hole 103 in the axial direction by action of pressurized fluid introduced via the first port 118 or the second port 126. This causes the piston rod 108 connected to the piston unit 18 to reciprocate.

Specifically, while the piston unit 18 is located at the retracted position illustrated in FIG. 11, the second port 126 is opened to the atmosphere, and air is supplied from a pressurized fluid supply source (not illustrated) to the first pressure chamber 103a via the first port 118, the first central hollow portion 116, and the hole 148a. The air pushes the piston unit 18 toward the rod cover 106. This causes the piston unit 18 to be displaced (advanced) toward the rod cover 106 together with the piston rod 108. In this case, the air inside a second pressure chamber 103b is discharged from the second port 126 via the hole 150a of the second holder 150 and the second central hollow portion 124.

When the second damper 68 comes into abutment against the second holder 150, the advancing motion of the piston unit 18 is stopped. Thus, the second damper 68 relieves impact and impact noise occurring when the piston unit 18 reaches the advanced position (stroke end on the rod cover 106 side). The second damper 68 may have a size sufficiently large to come into abutment against the rod cover 106 (and the second holder 150) when the piston unit 18 reaches the advanced position.

When the piston unit 18 approaches the advanced position, the second cushioning member 142 is inserted into the hole 150a of the second holder 150. This causes the inner circumference of the second cushion seal 146 to come into contact with the outer circumferential surface (straight portion 142a) of the second cushioning member 142 and thus creates an airtight seal at the contact area. The airtight seal prevents the air from flowing from the second pressure chamber 103b to the second central hollow portion 124 via the hole 150a.

As a result, an air cushion is formed in the second pressure chamber 103b. The air cushion in the second pressure chamber 103b serves as displacement resistance during the displacement of the piston unit 18 toward the rod cover 106 and decelerates the displacement of the piston unit 18 in the vicinity of the stroke end on the rod cover 106 side. Consequently, impact occurring when the piston unit 18 reaches the stroke end is further relieved.

On the other hand, while the piston unit 18 is located at the advanced position (stroke end on the rod cover 106 side), the first port 118 is opened to the atmosphere, and air is supplied from the pressurized fluid supply source (not illustrated) to the second pressure chamber 103b via the second port 126, the second central hollow portion 124, and the hole 150a. The air pushes the piston unit 18 toward the head cover 104. This causes the piston unit 18 to be displaced (retracted) toward the head cover 104. In this case, the air inside the first pressure chamber 103a is discharged from the first port 118 via the hole 148a of the first holder 148 and the first central hollow portion 116.

When the first damper 138 comes into abutment against the first holder 148, the retracting motion of the piston unit 18 is stopped. Thus, the first damper 13S relieves impact and impact noise occurring when the piston unit 18 reaches the retracted position (stroke end on the head cover 104 side).

When the piston unit 18 approaches the retracted position, the first cushioning member 140 is inserted into the hole 148a of the first holder 148. This causes the inner circumference of the first cushion seal 144 to come into contact with the outer circumferential surface (straight portion 140a) of the first cushioning member 140 and thus creates an airtight seal at the contact area. The airtight seal prevents the air from flowing from the first pressure chamber 103a to the first central hollow portion 116 via the hole 148a.

As a result, an air cushion is formed in the first pressure chamber 103a. The air cushion in the first pressure chamber 103a serves as displacement resistance during the displacement of the piston unit 18 toward the head cover 104 and decelerates the displacement of the piston unit 18 in the vicinity of the stroke end on the head cover 104 side. Consequently, impact occurring when the piston unit 18 reaches the stroke end is further relieved.

In this case, the ring-shaped second cushioning member 142 is joined to the outer circumferential surface of the piston rod 108 in this embodiment. In the assembly process (production process), the second cushioning member 142 can be attached to the outer circumferential surface of the piston rod 108 after or before assembling a piston assembly 74e including the piston unit 18 and the piston rod 108 by stacking the plurality of components (such as the first piston member 40) and the packing 34 on the piston rod 108 in the axial direction. Consequently, the cushioning mechanism 110 can be easily obtained while the structure of the piston unit 18 that can be assembled by stacking the components in the axial direction (structure which makes it easy to automate assembly process) is adopted.

Figure 12A:
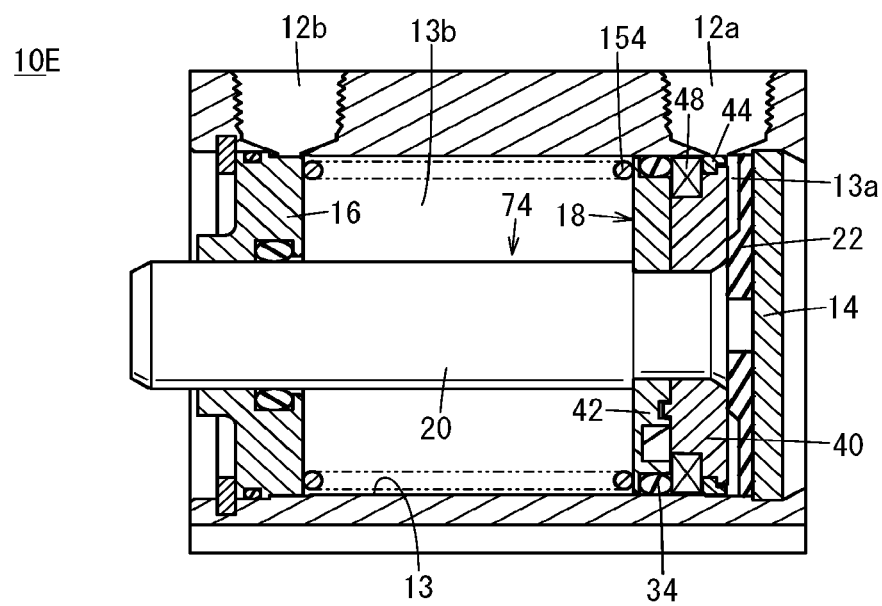
FIG. 12A is a cross-sectional view of a fluid pressure cylinder according to a fifth embodiment of the present invention.

The fluid pressure cylinder 10E according to the fifth embodiment illustrated in FIG. 12A is configured as a so-called single-acting cylinder. Specifically, the fluid pressure cylinder 10E has a structure similar to the structure of the fluid pressure cylinder 10A according to the first embodiment except that the second damper 68 is removed and that a spring 154 is alternatively disposed between the piston unit 18 and the rod cover 16. In this case, the second port 12b is open to the atmosphere.

In the fluid pressure cylinder 10E, when pressurized fluid is supplied to the first pressure chamber 13a via the first port 12a, the piston unit 18 is displaced (advanced) toward the rod cover 16 by the pressurized fluid and reaches the stroke end at the advanced position. When the supply of the pressurized fluid to the first port 12a is stopped and the first port 12a is opened to the atmosphere, the piston unit 18 is displaced (retracted) toward the head cover 14 by the elastic biasing force of the spring 154 and reaches the stroke end at the retracted position.

Figure 12B:
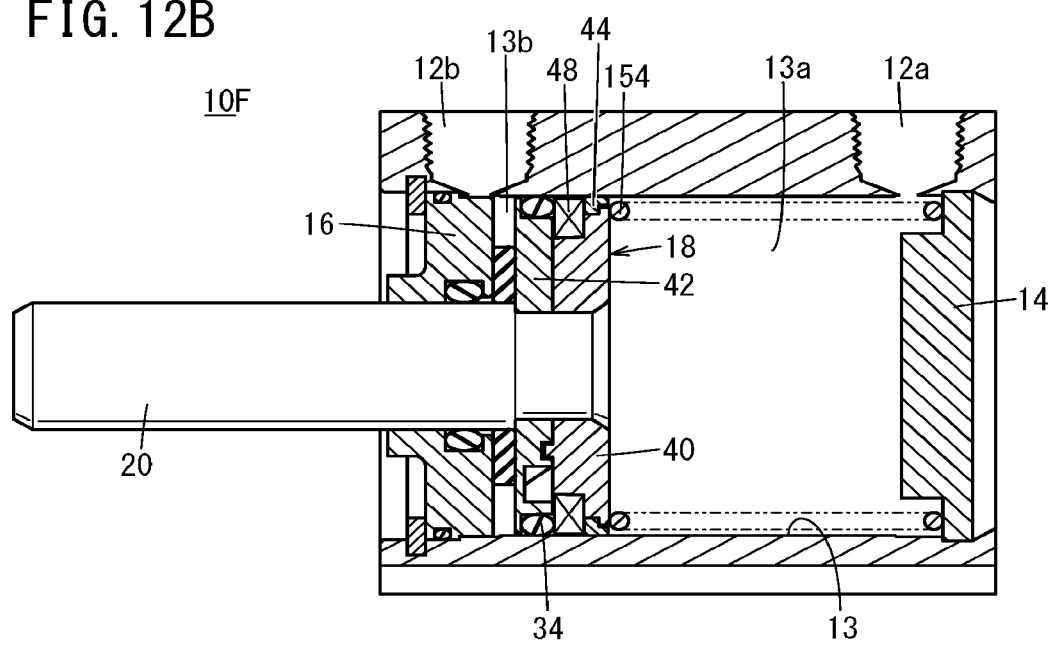
FIG. 12B is a cross-sectional view of a fluid pressure cylinder according to a sixth embodiment of the present invention.

The fluid pressure cylinder 10F according to the sixth embodiment illustrated in FIG. 12B is also configured as a so-called single-acting cylinder. Specifically, the fluid pressure cylinder 10F has a structure similar to the structure of the fluid pressure cylinder 10A according to the first embodiment except that the first damper 22 is removed and that the spring 154 is alternatively disposed between the piston unit 18 and the head cover 14. In this case, the first port 12a is opened to the atmosphere.

In the fluid pressure cylinder 10F, when pressurized fluid is supplied to the second pressure chamber 13b via the second port 12b, the piston unit 18 is displaced (retracted) toward the head cover 14 by the pressurized fluid and reaches the stroke end at the retracted position. When the supply of the pressurized fluid to the second port 12b is stopped and the second port 12b is opened to the atmosphere, the piston unit 18 is displaced (advanced) toward the rod cover 16 by the elastic biasing force of the spring 154 and reaches the stroke end at the advanced position.

The present invention is not limited to the above-described embodiments, and various modifications can be made without departing from the scope of the present invention. For example, the present invention is applicable to fluid pressure cylinders provided with piston units and cylinder tubes having non-circular (quadrangular or elongated circular such as elliptical) cross-sections. Moreover, the present invention is also applicable to multi-rod (such as dual rod) fluid pressure cylinders provided with a plurality of pistons and piston rods.

Yet moreover, the present invention is not limited to the fluid pressure cylinders used as actuators or the like, and is also applicable to different forms of fluid pressure device including pistons. The different forms of fluid pressure device equipped with pistons, to which the present invention is applicable, include, for example, a valve device for switching channels by moving a valve element using a piston, a length-measurement cylinder for measuring length by displacing a piston connected to a piston rod serving as an input shaft, a sliding table connected to a piston and configured to be displaced by displacing the piston via a piston rod, and a chuck device for gripping a workpiece using a gripping part that opens and closes by displacing a piston and then converting the displacement of the piston.

The invention claimed is:

1. A fluid pressure device comprising:
a body having a slide hole inside the body;
a piston unit movable in an axial direction inside the slide hole; and
a piston rod protruding from the piston unit in the axial direction; wherein:
the piston unit includes a packing and a piston body comprising a plurality of members, the piston body being provided with a packing mounting groove in which the packing is mounted;
the piston body includes, as the plurality of members, a first piston member and a second piston member stacked in the axial direction;
a combination of at least two members of the plurality of members defines the packing mounting groove; and
one or both of the first piston member and the second piston member are provided with a hollow portion having a depth in the axial direction, wherein
the hollow portion has a plurality of bottomed grooves disposed at intervals in a circumferential direction of the piston body; and
each of the bottomed grooves has an arc shape extending in the circumferential direction of the piston body.

2. The fluid pressure device according to claim 1, wherein the first, piston member and the second piston member are castings.

3. The fluid pressure device according to claim 1, wherein the hollow portion has a through-hole passing through only one of the first piston member and the second piston member in the axial direction.

4. A fluid pressure device comprising:
a body having a slide hole inside the body;
a piston unit movable in an axial direction inside the slide hole; and
a piston rod protruding from the piston unit in the axial direction; wherein:
the piston unit includes a packing and a piston body comprising a plurality of members, the piston body being provided with a packing mounting groove in which the packing is mounted;
the piston body includes, as the plurality of members, a first piston member and a second piston member stacked in the axial direction;
a combination of at least two members of the plurality of members defines the packing mounting groove; and
one or both of the first piston member and the second piston member are provided with a hollow portion having a depth in the axial direction, wherein:
the hollow portion has a through-hole passing through only one of the first piston member and the second piston member in the axial direction;
one member of the first piston member and the second piston member that is provided with the through-hole includes a protruding portion protruding toward another member of the first piston member and the second piston member that is not provided with the through-hole; and
the protruding portion has, on an outer circumferential part thereof, a recess portion recessed inward and which constitutes part of the through-hole.

5. The fluid pressure device according to claim 4, wherein:
the piston body further includes a magnet or a spacer as the plurality of members; and
the protruding portion has a supporting protrusion protruding outward on the outer circumferential part and at a circumferential position different from a position of the recess portion, the supporting protrusion being configured to support the magnet or the spacer.

6. The fluid pressure device according to claim 4, wherein:
the one member provided with the through-hole is provided with a wall portion protruding outwardly toward the through-hole; and
the wall portion is disposed at a position adjoining the recess portion on a side remote, in the axial direction, from the other member not provided with the through-hole.

7. The fluid pressure device according to claim 6, wherein the recess portion is provided with a rib configured to reinforce the wall portion.

8. A fluid pressure device comprising:
a body having a slide hole inside the body;
a piston unit movable in an axial direction inside the slide hole; and
a piston rod protruding from the piston unit in the axial direction; wherein:
the piston unit includes a packing and a piston body comprising a plurality of members, the piston body being provided with a packing mounting groove in which the packing is mounted;
the piston body includes, as the plurality of members, a first piston member and a second piston member stacked in the axial direction;
a combination of at least two members of the plurality of members defines the packing mounting Groove; and
one or both of the first piston member and the second piston member are provided with a hollow portion having a depth in the axial direction, wherein:
the hollow portion includes a first hollow portion defined in the first piston member and a second hollow lightening portion defined in the second piston member;
one of the first hollow portion and the second hollow portion is a through-hole passing through the corresponding piston member in the axial direction; and
another of the first hollow portion and the second hollow portion is a bottomed groove having a depth in the axial direction.

9. The fluid pressure device according to claim 8, wherein:
the through-hole comprises a plurality of through-holes disposed at intervals in a circumferential direction; and
the groove comprises a plurality of grooves disposed at intervals in the circumferential direction.

10. The fluid pressure device according to claim 9, wherein:
one member of the first piston member and the second piston member that is provided with the plurality of through-holes includes a protruding portion protruding toward another member of the first piston member and the second piston member that is provided with the plurality of grooves;

the protruding portion has a plurality of supporting protrusions arranged at intervals in the circumferential direction on an outer circumferential part of the protruding portion, the supporting protrusions protruding outward; and the other member of the first piston member and the second piston member that is provided with the plurality of grooves has an abutting surface disposed between two of the grooves that are circumferentially adjacent to each other, the abutting surface being configured to abut against an end surface of at least one of the plurality of supporting protrusions.

11. The fluid pressure device according to claim 10, wherein:

the plurality of supporting protrusions include a first supporting protrusion abutting against the abutting surface and a second supporting protrusion disposed at a circumferential position different from a position of the abutting surface; and a circumferential width of the second supporting protrusion is smaller than a circumferential width of the first supporting protrusion.

12. The fluid pressure device according to claim 10, wherein:

one of the first piston member and the second piston member is provided with a positioning protrusion protruding in the axial direction;

another of the first piston member and the second piston member is provided with a positioning recess recessed in the axial direction; and the positioning protrusion is inserted into the positioning recess.

13. The fluid pressure device according to claim 1, wherein the hollow portion comprises a plurality of hollow portions disposed at intervals in a circumferential direction.

14. The fluid pressure device according to claim 1, wherein the fluid pressure device is configured as a fluid pressure cylinder, a valve device, a length-measurement cylinder, a sliding table, or a chuck device.

15. A method for producing a piston assembly provided with a piston unit including a packing mounted in a packing mounting groove and a piston rod protruding from the piston unit, comprising the steps of:

stacking a plurality of members including a first piston member and a second piston member by relatively moving the packing and the plurality of members in an axial direction in sequence, relative to the piston rod; and securing the first piston member and the second piston member to the piston rod; wherein:

the plurality of members constitute a piston body provided with the packing mounting groove;

a combination of at least two members of the plurality of members defines the packing mounting groove; and one or both of the first piston member and the second piston member are provided with a hollow portion having a depth in the axial direction, wherein the hollow portion has a plurality of bottomed grooves disposed at intervals in a circumferential direction of the piston body; and each of the bottomed grooves has an arc shape extending in the circumferential direction of the piston body.

16. The method for producing the piston assembly according to claim 15, wherein the piston rod is in an upright position during the step of stacking the plurality of members.

17. The fluid pressure device according to claim 1, wherein:

one of the first piston member and the second piston member includes a protruding portion protruding toward another of the first piston member and the second piston member; and the protruding portion has, on an outer circumferential part thereof, a recess portion recessed inward and which constitutes part of the hollow portion.

* * * * *